United States Patent
Wang et al.

(10) Patent No.: US 11,928,156 B2
(45) Date of Patent: Mar. 12, 2024

(54) LEARNING-BASED AUTOMATED MACHINE LEARNING CODE ANNOTATION WITH GRAPH NEURAL NETWORK

(71) Applicant: International Business Machines Corporation, Armonk, NY (US)

(72) Inventors: Dakuo Wang, Cambridge, MA (US); Lingfei Wu, Elmsford, NY (US); Xuye Liu, Troy, NY (US); Yi Wang, Ann Arbor, MI (US); Chuang Gan, Cambridge, MA (US); Jing Xu, Xi'an (CN); Xue Ying Zhang, Xi'an (CN); Jun Wang, Xi'an (CN); Jing James Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 17/088,018

(22) Filed: Nov. 3, 2020

(65) Prior Publication Data

US 2022/0138266 A1    May 5, 2022

(51) Int. Cl.
*G06N 3/08* (2023.01)
*G06F 16/901* (2019.01)
(Continued)

(52) U.S. Cl.
CPC .... *G06F 16/90332* (2019.01); *G06F 16/9024* (2019.01); *G06F 16/9558* (2019.01); *G06F 40/211* (2020.01); *G06N 3/08* (2013.01)

(58) Field of Classification Search
CPC .......... G06F 16/90332; G06F 16/9558; G06F 16/9024; G06F 40/211; G06N 3/08
See application file for complete search history.

(56) References Cited

U.S. PATENT DOCUMENTS

| 4,860,203 A | 8/1989 | Corrigan et al. |
| 7,788,640 B2 | 8/2010 | Grimaldi |
| (Continued) | | |

FOREIGN PATENT DOCUMENTS

| CN | 102339218 A | 2/2012 |
| WO | WO2019223804 A1 | 11/2019 |

OTHER PUBLICATIONS

Choi, YunSeok, Suah Kim, and Jee-Hyong Lee, "Source Code Summarization Using Attention-based Keyword Memory Networks", Feb. 2020, 2020 IEEE International Conference on Big Data and Smart Computing (BigComp), pp. 564-570. (Year: 2020).*

(Continued)

*Primary Examiner* — Daniel C Washburn
*Assistant Examiner* — James Boggs
(74) *Attorney, Agent, or Firm* — Caleb Wilkes; Otterstedt & Kammer PLLC

(57) ABSTRACT

Obtain, at a computing device, a segment of computer code. With a classification module of a machine learning system executing on the computing device, determine a required annotation category for the segment of computer code. With an annotation generation module of the machine learning system executing on the computing device, generate a natural language annotation of the segment of computer code based on the segment of computer code and the required annotation category. Provide the natural language annotation to a user interface for display adjacent the segment of computer code.

15 Claims, 23 Drawing Sheets

(51) Int. Cl.
  *G06F 16/9032* (2019.01)
  *G06F 16/955* (2019.01)
  *G06F 40/211* (2020.01)

(56) References Cited

U.S. PATENT DOCUMENTS

| | | | |
|---|---|---|---|
| 8,122,433 | B2 | 2/2012 | Bank et al. |
| 8,819,629 | B2 | 8/2014 | Sherrill |
| 9,954,746 | B2 | 4/2018 | Kashtan et al. |
| 10,656,938 | B2 | 5/2020 | Mairet et al. |
| 11,360,763 | B2 * | 6/2022 | Wang ................ G06F 8/73 |
| 2021/0064666 | A1 | 3/2021 | Wang |
| 2021/0065048 | A1 | 3/2021 | Salonidis |
| 2021/0271956 | A1 | 9/2021 | Wang |
| 2021/0271966 | A1 | 9/2021 | Wang |
| 2021/0304028 | A1 | 9/2021 | Weidele |
| 2022/0004914 | A1 | 1/2022 | Kirchner |
| 2022/0043978 | A1 | 2/2022 | Wang |
| 2022/0044136 | A1 | 2/2022 | Wang |

OTHER PUBLICATIONS

Agashe, Rajas, Srinivasan Iyer, and Luke Zettlemoyer, "JuICe: A Large Scale Distantly Supervised Dataset for Open Domain Context-based Code Generation", Nov. 2019, Proceedings of the 2019 Conference on Empirical Methods in Natural Language Processing (EMNLP-IJCNLP), pp. 5436-5446. (Year: 2019).*
LeClair, Alexander, Sakib Haque, Lingfei Wu, and Collin McMillan, "Improved Code Summarization via a Graph Neural Network", Oct. 2020, Proceedings of the 28th International Conference on Program Comprehension (ICPC '20), pp. 184-195. (Year: 2020).*
Zhang, Amy X., Michael J. Muller, and Dakuo Wang, "How do Data Science Workers Collaborate? Roles, Workflows, and Tools", May 2020, Proceedings of the ACM on Human-Computer Interaction, vol. 4, No. CSCW1, Article 22, pp. 1-23. (Year: 2020).*
Yimam, Seid Muhie, Richard Eckart de Castilho, Iryna Gurevych, and Chris Biemann, Jun. 2014, "Automatic Annotation Suggestions and Custom Annotation Layers in WebAnno", Proceedings of 52nd Annual Meeting of the Association for Computational Linguistics: System Demonstrations (ACL), pp. 91-96. (Year: 2014).*
Fowkes, Jaroslav, Pankajan Chanthirasegaran, Razvan Ranca, Miltiadis Allamanis, Mirella Lapata, and Charles Sutton, "TASSAL: Autofolding for Source Code Summarization", May 2016, 2016 IEEE/ACM 38th International Conference on Software Engineering Companion (ICSE-C), pp. 649-652. (Year: 2016).*
Wang, April Yi, Dakuo Wang, Jaimie Drozdal, Michael Muller, Soya Park, Justin D. Weisz, Xuye Liu, Lingfei Wu, and Casey Dugan, "Documentation Matters: Human-Centered AI System to Assist Data Science Code Documentation in Computational Notebooks", 2022, ACM TOCHI, vol. 29, No. 2, Article 17, pp. 1-33. (Year: 2022).*
Wang, April Yi, Dakuo Wang, Jaimie Drozdal, Michael Muller, Soya Park, Justin D. Weisz, Xuye Liu, Lingfei Wu, and Casey Dugan, "Themisto: Towards Automated Documentation Generation in Computational Notebooks", Feb. 2021, ArXiv abs/2102.12592, pp. 1-29. (Year: 2021).*
LeClair, Alexander, Zachary Eberhart, and Collin McMillan, "Adapting Neural Text Classification for Improved Software Categorization", Jun. 2018, arXiv preprint arXiv:1806.01742. (Year: 2018).*
Wang et al., Human-AI Collaboration in Data Science: Exploring Data Scientists' Perceptions of Automated AI. Proceedings of the ACM on Human-Computer Interaction, 3(CSCW), pp. 1-24, Nov. 2019.
Dozaral et al., Exploring Information Needs for Establishing Trust in Automated Data Science Systems. IUI Mar. 2020 11 pages.
Wang et al., AutoAI: Automating the End-to-End AI Lifecycle with Humans-in-the-Loop. In Proceedings of the 25th International Conference on Intelligent User Interfaces Companion (pp. 77-78), Mar. 2020.
Wu et al., A comprehensive survey on graph neural networks. IEEE Transactions on Neural Networks and Learning Systems, Mar. 2020 22 pages.
LeClair et al., Improved code summarization via a graph neural network. arXiv preprint arXiv:2004.02843, Apr. 2020 12 pages.
Donald E. Knuth. 1984. Literate Programming. Comput. J. 27, 2 (1984), 97-111. https://doi.org/10.1093/comjnl/27.2.97.
Project Jupyter. 2015. Project Jupyter: Computational Narratives as the Engine of Collaborative Data Science. https://blog.jupyter.org/project-jupyter-computational-narratives-as-the-engine-of-collaborative-data-science-2b5fb94c3c58. 24 pages.
Project Jupyter. [n.d.]. JupyterLab: the next generation of the Jupyter Notebook. https://blog.jupyter.org/jupyterlab-the-next-generation-of-thejupyter-notebook-5c949dabea3 Jul. 14, 2016 5 Pages.
Jeffrey M. Perkel. 2018. Why Jupyter is data scientists' computational notebook of choice. Nature 563 (2018), 145. https://doi.org/10.1038/d41586-018-07196-1 Nov. 2018 Abstract Only 4 Pages.
Jiali Liu, Nadia Boukhelifa, and James R Eagan. 2019. Understanding the role of alternatives in data analysis practices. IEEE transactions on visualization and computer graphics 26, 1 (2019), 66-76.
Mary Beth Kery, Marissa Radensky, Mahima Arya, Bonnie E. John, and Brad A. Myers. 2018. The Story in the Notebook: Exploratory Data Science Using a Literate Programming Tool. In Proceedings of the 2018 CHI Conference on Human Factors in Computing Systems (Montreal QC, Canada) (CHI '18). ACM, New York, NY, USA, Article 174, 11 pages. https://doi.org/10.1145/3173574.3173748.
Adam Rule, Aurélien Tabard, and James D Hollan. 2018. Exploration and explanation in computational notebooks. In Proceedings of the 2018 CHI Conference on Human Factors in Computing Systems. 1-12. Apr. 21-26, 2018.
Souti Chattopadhyay, Ishita Prasad, Austin Z Henley, Anita Sarma, and Titus Barik. 2020. What's Wrong with Computational Notebooks? Pain Points, Needs, and Design Opportunities. In Proceedings of the 2020 CHI Conference on Human Factors in Computing Systems. 1-12.
Mary Beth Kery, Bonnie E. John, Patrick O'Flaherty, Amber Horvath, and Brad A. Myers. 2019. Towards Effective Foraging by Data Scientists to Find Past Analysis Choices. In Proceedings of the 2019 CHI Conference on Human Factors in Computing Systems (Glasgow, Scotland Uk) (CHI '19).
Andrew Head, Fred Hohman, Titus Barik, Steven M. Drucker, and Robert DeLine. 2019. Managing Messes in Computational Notebooks. In Proceedings of the 2019 CHI Conference on Human Factors in Computing Systems (Glasgow, Scotland Uk) (CHI '19). ACM, New York, NY, USA, Article 270, 12 pages. https://doi.org/10.1145/3290605.3300500.
John Wenskovitch, Jian Zhao, Scott Carter, Matthew Cooper, and Chris North. 2019. Albireo: An Interactive Tool for Visually Summarizing Computational Notebook Structure. In 2019 IEEE Visualization in Data Science (VDS). IEEE, 1-10.
April YiWang, ZihanWu, Christopher Brooks, and Steve Oney. 2020. Callisto: Capturing the "Why" by Connecting Conversations with Computational Narratives. In Proceedings of the 2020 CHI Conference on Human Factors in Computing Systems (CHI '20). ACM. abstract only 6 pages.
Sam Lau, Ian Drosos, Julia M Markel, and Philip J Guo. 2020. The Design Space of Computational Notebooks: An Analysis of 60 Systems in Academia and Industry. In 2020 IEEE Symposium on Visual Languages and Human-Centric Computing (VL/HCC). IEEE, 1-11.
Adam Rule, Aurélien Tabard, and James D Hollan. 2018. Exploration and explanation in computational notebooks. In Proceedings of the 2018 CHI Conference on Human Factors in Computing Systems. 1-12.
Sergio Cozzetti B de Souza, Nicolas Anquetil, and Kathia M de Oliveira. 2005. A study of the documentation essential to software maintenance. In Proceedings of the 23rd annual international conference on Design of communication: documenting & designing for pervasive information. 68-75.
R Stuart Geiger, Nelle Varoquaux, Charlotte Mazel-Cabasse, and Chris Holdgraf. 2018. The types, roles, and practices of documentation in data analytics open source software libraries. Computer Supported Cooperative Work (CSCW) 27, 3-6 (2018), 767-802.

(56) References Cited

OTHER PUBLICATIONS

Matthew Arnold, Rachel KE Bellamy, Michael Hind, Stephanie Houde, Sameep Mehta, Aleksandra Mojsilovi'c, Ravi Nair, K Natesan Ramamurthy, Alexandra Olteanu, David Piorkowski, et al. 2019. FactSheets: Increasing trust in AI services through supplier's declarations of conformity. IBM Journal of Research and Development 63, 4/5 (2019), 6-1. 31 pages.

João Felipe Pimentel, Saumen Dey, Timothy McPhillips, Khalid Belhajjame, David Koop, Leonardo Murta, Vanessa Braganholo, and Bertram Ludäscher. 2016. Yin & Yang: demonstrating complementary provenance from noWorkflow & YesWorkflow. In International Provenance and Annotation Workshop. Springer, 161-165.

Amber Horvath, Mariann Nagy, Finn Voichick, Mary Beth Kery, and Brad A Myers. 2019. Methods for investigating mental models for learners of APIs. In Extended Abstracts of the 2019 CHI Conference on Human Factors in Computing Systems. 1-6.

Stephen Oney and Joel Brandt. 2012. Codelets: linking interactive documentation and example code in the editor. In Proceedings of the SIGCHI Conference on Human Factors in Computing Systems. 2697-2706.

Uri Alon, Shaked Brody, Omer Levy, and Eran Yahav. 2018. code2seq: Generating sequences from structured representations of code. arXiv preprint arXiv:1808.01400 (2018). 22 pages.

Minh-Thang Luong, Hieu Pham, and Christopher D Manning. 2015. Effective approaches to attention-based neural machine translation. arXiv preprint arXiv:1508.04025 (2015). 11 pages.

Ryan Louie, Andy Coenen, Cheng Zhi Huang, Michael Terry, and Carrie J Cai. 2020. Novice-AI Music Co-Creation via AI-Steering Tools for Deep Generative Models. In Proceedings of the 2020 CHI Conference on Human Factors in Computing Systems 1-13. (HTML version 8 pages).

Peter Mell and Timothy Grance, The NIST Definition of Cloud Computing, NIST Special Publication 800-145, Sep. 2011, cover, i-iii, 1-3.

\* cited by examiner

FIG. 5 e.g., PRESENT PROCESS 501

Load data

```
In [2]: train = pd.read_csv('../input/house-prices-advanced-regression-techniques/train.csv')
        test = pd.read_csv('../input/house-prices-advanced-regression-techniques/test.csv')
        print("Data is loaded!")

Data is loaded!

In [9]: sns.set_style("whitegrid")
        missing = train.isnull().sum()
        missing = missing[missing > 0]
        missing.sort_values(inplace=True)
        missing.plot.bar()

Out[9]: <matplotlib.axes._subplots.AxesSubplot at 0x7fddb0c0d358>
``` e.g., INTERPRET RESULT 503

19 attributes have missing values, 5 over 50% of all data. Most of times NA means lack of subject described by attribute, like missing pool, fence, no garage and basement.

```
In [10]: y = train['SalePrice']
         plt.figure(1); plt.title('Johnson SU')
         sns.distplot(y, kde=False, fit=stats.johnsonsu)
         plt.figure(2); plt.title('Normal')
         sns.distplot(y, kde=False, fit=stats.norm)
         plt.figure(3); plt.title('Log Normal')
         sns.distplot(y, kde=False, fit=stats.lognorm)
```

FIG. 6

Table 601 / 605 (Category / Process descriptions):

| CATEGORY | |
|---|---|
| PROCESS | EXPLAIN WHAT THE CODE BELOW IS DOING |
| ALTERNATIVE | EXPLAIN AN ALTERNATIVE SOLUTION (WHICH IS NOT IMPLEMENTED) |
| RESULT | EXPLAIN THE RESULT |
| EDUCATION | EXPLAIN HOW A METHOD WORKS IN GENERAL |
| REFERENCE | EXTERNAL REFERENCES |
| PIPELINE | EXPLAIN A WORKFLOW |
| REASON | EXPLAIN WHY |
| PROBLEM OVERVIEW | EXPLAIN WHAT THE PROBLEM IS; WHAT THE PROJECT IS; |
| DATA OVERVIEW | EXPLAIN WHERE THE DATA COMES FROM; WHAT FEATURES ARE INCLUDED; POTENTIAL BIAS IN THE DATA |
| AUTHOR INFORMATION | AUTHOR'S BACKGROUND |
| AUDIENCE | DIMENSION |
| OTHERS | THINGS THAT ARE NOT COVERED SO FAR |

Table 603 / 607 (Stage descriptions):

| STAGE | |
|---|---|
| DATA LOADING | THE PROCESS OF ACQUIRING DATA THAT WILL BE USED TO BUILD A MODEL |
| DATA PROFILING AND EXPLORATORY DATA ANALYSIS | AUTOMATICALLY ASSESS OVERALL DATA QUALITY, DETECT NOISE IN LABELS, SKEWNESS AND CORRELATIONS, CLASS IMBALANCE, AND TARGET DISTRIBUTIONS |
| DATA CLEANING AND QUALITY REMEDIATION | AUTO CLEANING OR FILTERING WITH EXPLANATIONS |
| DATA BIAS DETECTION AND MITIGATION | e.g., FIND BIAS, HOMOGENEITY IN TARGET LABELS AND PROPOSE DE-BIAS TECHNIQUES |
| VARIABLE ENCODING | ONE HOT ENCODING, ORDINAL ENCODING, SYSTEM CAN TRY TO DETERMINE THE BEST ENCODING STRATEGY FOR CERTAIN FEATURES |
| FEATURE TRANSFORMATION | e.g., PRINCIPAL COMPONENT DECOMPOSITION/PCD, ARITHMETIC, TRIGONOMETRIC FUNCTIONS, SYSTEM CAN DETERMINE A RANKED LIST OF FEATURES THAT SHOULD BE ADDED OR DROPPED |
| FEATURE AGGREGATION | e.g., AGGREGATION BASED ON TIME OR LOCATION |
| FEATURE SELECTION | REMOVE UNNECESSARY AND REPETITIVE FEATURES TO CREATE AN OPTIMAL FEATURE SET |
| FEATURE AUGMENTATION WITH DOMAIN KNOWLEDGE | AUTOMATICALLY IDENTIFY COLUMN CONCEPTS AND LINK THEM TO DERIVE USEFUL NEW FEATURES BASED ON DOMAIN KNOWLEDGE SUCH AS THAT IN WIKIPEDIA |
| SUB-SAMPLING AND TRAIN-TEST SPLITTING | AUTOMATICALLY DETERMINE THE BEST STRATEGY FOR TRAIN-TEST SPLITTING AND SUB-SAMPLING METHODOLOGY FOR LARGE DATA |
| MODEL SELECTION | THE PROCESS OF CHOOSING THE RIGHT MODEL TO FIT TO THE DATA |
| MODEL PARAMETER TUNING | THE PROCESS OF CHOOSING MODEL PARAMETERS THAT MAKE IT PERFORM WELL |
| MODEL VALIDATION | THE PROCESS OF ENSURING THE GENERALIZABILITY OF A MODEL |
| APPLYING MODEL | APPLY MODEL TO THE GIVEN TEST DATASET |

FIG. 10

```
- Program {
    type: "Program"
    start: 0
    end: 217
    - body: [
      - ExpressionStatement {
          type: "ExpressionStatement"
          start: 0
          end: 85
          + expression: AssignmentExpression {type, start, end, operator, left, ... +1}
        }
      - ExpressionStatement {
          type: "ExpressionStatement"
          start: 106
          end: 189
          - expression: AssignmentExpression {
              type: "AssignmentExpression"
              start: 106
              end: 189
              operator: "="
              - left: Identifier = $node {
                  type: "Identifier"
                  start: 106
                  end: 110
                  name: "test"
                }
              + right: CallExpression {type, start, end, callee, arguments}
            }
        }
      + ExpressionStatement {type, start, end, expression}
    ]
    sourceType: "module"
  }
```

FIG. 13

| CATEGORY | N | DESCRIPTION | EXAMPLE |
|---|---|---|---|
| PROCESS | 2115 (58.65%) | THE MARKDOWN CELL DESCRIBES WHAT THE FOLLOWING CODE CELL IS DOING. THIS ALWAYS APPEARS BEFORE THE RELEVANT CODE CELL. | TRANSFORMING FEATURE X TO A NEW BINARY VARIABLE |
| HEADLINE | 1167 (32.36%) | THE MARKDOWN CELL CONTAINS A HEADLINE IN MARKDOWN SYNTAX. THE CELL IS USED FOR NAVIGATION PURPOSES OR MARKING THE STRUCTURE OF THE NOTEBOOK. IT MAY BE RELEVANT TO A NEARBY CODE CELL. | # BLENDING MODELS |
| RESULT | 692 (19.19%) | THE MARKDOWN CELL EXPLAINS THE OUTPUT. THIS TYPE ALWAYS APPEARS AFTER THE RELEVANT CODE CELL. | IT TURNS OUT THERE IS A LONG TAIL OF OUTLYING PROPERTIES... |
| EDUCATION | 414 (11.48%) | THE MARKDOWN CELL PROVIDES A RICH CONTENT AS AN EDUCATIONAL TUTORIAL, BUT MAY NOT BE RELEVANT TO A SPECIFIC CODE CELL. | MULTICOLLINEARITY INCREASES THE STANDARD ERRORS OF THE COEFFICIENTS. |
| REASON | 227 (6.30%) | THE MARKDOWN CELL EXPLAINS THE REASONS WHY CERTAIN FUNCTIONS ARE USED OR WHY A TASK IS PERFORMED. THIS MAY APPEAR BEFORE OR AFTER THE RELEVANT CODE CELL. | WE DO THIS MANUALLY, BECAUSE ML MODELS WON'T BE ABLE TO RELIABLY TELL THE DIFFERENCES. |
| ToDo | 202 (5.60%) | THE MARKDOWN CELL DESCRIBES A LIST OF ACTIONS FOR FUTURE IMPLEMENTATIONS. THIS NORMALLY IS NOT RELEVANT TO A SPECIFIC CODE CELL. | 1. APPLY MODELS<br>2. GET CROSS VALIDATION SCORES<br>3. CALCULATE THE MEAN |
| REFERENCE | 200 (5.55%) | THE MARKDOWN CELL CONTAINS AN EXTERNAL REFERENCE. THIS IS ALSO RELEVANT TO THE ADJACENT CODE CELL. | GRADIENT BOOSTING REGRESSION REFER [HERE](HTTPS://...) |
| META-INFORMATION | 141 (3.91%) | THE MARKDOWN CELL CONTAINS META-INFORMATION SUCH AS PROJECT OVERVIEW, AUTHOR'S INFORMATION, AND A LINK TO THE DATA SOURCES. THIS OFTEN IS NOT RELEVANT TO A SPECIFIC CODE. | THE PURPOSE OF THIS NOTEBOOK IS TO BUILD A MODEL WITH TENSOR FLOW. |
| SUMMARY | 51 (1.41%) | THE MARKDOWN CELL SUMMARIZES WHAT HAS BEEN DONE SO FAR FOR A SECTION OR A SERIES OF STEPS. THIS OFTEN IS NOT RELEVANT TO A SPECIFIC CODE. | IN SUMMARY<br>BY EDA WE FOUND A STRONG IMPACT OF FEATURES LIKE AGE, EMBARKED.. |

FIG. 14

| STAGE | TOTAL | TASK | N |
|---|---|---|---|
| ENVIRONMENT CONFIGURATION | 162 (4.49%) | LIBRARY LOADING | 33 (0.92%) |
| | | DATA LOADING | 129 (3.58%) |
| DATA PREPARATION AND EXPLORATION | 1336 (37.05%) | DATA PREPARATION | 91 (2.52%) |
| | | EXPLORATORY DATA ANALYSIS | 960 (26.62%) |
| | | DATA CLEANING | 285 (7.90%) |
| FEATURE ENGINEERING AND SELECTION | 375 (10.40%) | FEATURE ENGINEERING | 120 (3.32%) |
| | | FEATURE TRANSFORMATION | 178 (4.94%) |
| | | FEATURE SELECTION | 77 (2.14%) |
| MODEL BUILDING AND SELECTION | 994 (27.57%) | MODEL BUILDING | 247 (6.85%) |
| | | DATA SUB-SAMPLING AND TRAIN-TEST SPLITTING | 61 (1.69%) |
| | | MODEL TRAINING | 377 (10.45%) |
| | | MODEL PARAMETER TUNING | 81 (2.25%) |
| | | MODEL VALIDATION AND ASSEMBLING | 288 (6.32%) |

FIG. 15

Global Forcasting Covid-19

The goal of this project is to build a model to predict the confirmed cases of Covid-19.

- `train.csv` - the training data

INSERT MARKDOWN ABOVE

Read the data  1503

Read a comma-separated values (csv) file into DataFrame; Return the first 5 rows.  1505

INSERT MARKDOWN BELOW

The table shows *[insert your text]*  1507

[12]:
```
train = pd.read_csv("./covid-input/train.csv")
test = pd.read_csv("./covid-input/test.csv")
train.head()
```
1501

[12]:

| | Id | Province/State | County/Region | Lat | Long | Date | ConfirmedCases | Fatalities |
|---|---|---|---|---|---|---|---|---|
| 0 | 1 | NaN | Country A | 33.0 | 65.0 | 2020-01-22 | 0.0 | 0.0 |

...es to help you annot

```
train = pd.read_csv('./house-input/train.csv')
test = pd.read_csv('./house-input/test.csv')
```
Read the data

```
all_data = pd.get_dummies(all_data)
```
Convert all the data

```
pred = Tree_model.predict(x_test)
pred = pd.DataFrame(pred)
pred.columns = ["ConfirmedCases_prediction"]
```
Predicate to use a predict function for tests

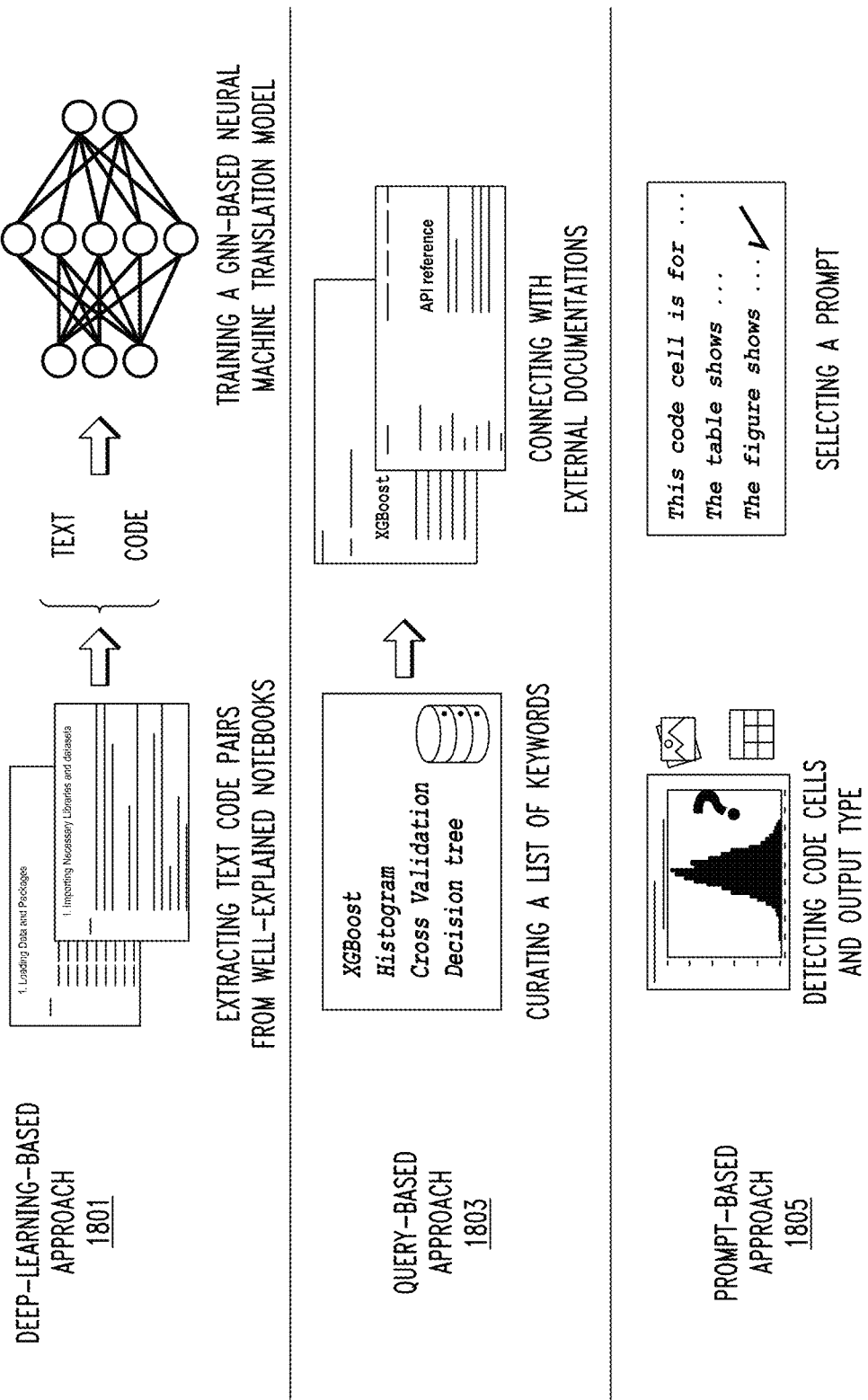

FIG. 19

| | CONDITION | M | SD |
|---|---|---|---|
| NUMBER OF ADDED MARKDOWN CELLS | EXPERIMENT | 8.04 | 2.40 |
| | CONTROL | 7.79 | 1.91 |
| NUMBER OF ADDED WORDS | EXPERIMENT | 95.75 | 50.56 |
| | CONTROL | 100.92 | 53.27 |
| **TASK COMPLETION TIME (secs) | EXPERIMENT | 391.12 | 200.15 |
| | CONTROL | 494.75 | 184.28 |
| *SATISFACTION WITH THE FINAL NOTEBOOK (-2 TO 2) | EXPERIMENT | 0.96 | 0.69 |
| | CONTROL | 0.54 | 0.83 |
| EXPERT RATING OF THE FINAL NOTEBOOK QUALITY: ACCURACY | EXPERIMENT | 1.62 | 0.45 |
| | CONTROL | 1.71 | 0.41 |
| **EXPERT RATING OF THE FINAL NOTEBOOK QUALITY: READABILITY | EXPERIMENT | 0.67 | 0.56 |
| | CONTROL | 1.04 | 0.66 |
| EXPERT RATING OF THE FINAL NOTEBOOK QUALITY: COMPLETENESS | EXPERIMENT | 0.21 | 0.57 |
| | CONTROL | 0.48 | 0.67 |

FIG. 20

| | $\bar{x}$ | $\sigma$ |
|---|---|---|
| PERCENTAGE OF CODE CELLS CHECKED FOR SUGGESTIONS | 86.11 | 18.89 |
| PERCENTAGE OF MARKDOWN CELLS CREATED BY SYSTEM | 45.31 | 33.16 |
| PERCENTAGE OF MARKDOWN CELLS CO-CREATED BY HUMAN AND SYSTEM | 41.52 | 30.18 |
| PERCENTAGE OF MARKDOWN CELLS CREATED BY HUMAN | 12.16 | 18.85 |

FIG. 21

| | STRONGLY DISAGREE | DISAGREE | NEUTRAL | AGREE | STRONGLY AGREE |
|---|---|---|---|---|---|
| THE PLUGIN WAS DIFFICULT TO USE. | 11 | 11 | 1 | 1 | 0 |
| IT WAS EASIER TO ACCOMPLISH THIS TASK WITH THE PLUGIN. | 1 | 0 | 1 | 12 | 10 |
| THE PLUGIN'S RECOMMENDATIONS ARE ACCURATE. | 0 | 1 | 3 | 18 | 2 |
| I TRUST THE PLUGIN'S RECOMMENDATIONS. | 0 | 1 | 6 | 13 | 4 |
| I WAS CONFUSED BY THE PLUGIN'S RECOMMENDATIONS | 9 | 12 | 1 | 2 | 0 |
| IF THE PLUGIN IS AVAILABLE, I WOULD USE IT IN THE FUTURE. | 0 | 1 | 2 | 10 | 11 |
| IF THE PLUGIN IS AVAILABLE, I WOULD RECOMMEND IT TO OTHERS. | 0 | 1 | 0 | 12 | 11 |

LEARNING-BASED AUTOMATED MACHINE LEARNING CODE ANNOTATION WITH GRAPH NEURAL NETWORK

BACKGROUND

The present invention relates to the electrical, electronic and computer arts, and more specifically, to machine learning and the like.

Computational notebooks allow data scientists to express their ideas through a combination of code and documentation. However, data scientists often pay attention only to the code, and neglect creating or updating their documentation during quick iterations, which leads to challenges in sharing their notebooks with others (and even to understanding their own notebooks when referring to them again in the future).

SUMMARY

Principles of the invention provide techniques for learning-based automated machine learning code annotation with graph neural network. In one aspect, an exemplary method includes obtaining, at a computing device, a segment of computer code; with a classification module of a machine learning system executing on the computing device, determining a required annotation category for the segment of computer code; with an annotation generation module of the machine learning system executing on the computing device, generating a natural language annotation of the segment of computer code based on the segment of computer code and the required annotation category; and providing the natural language annotation to a user interface for display adjacent the segment of computer code.

In another aspect, an exemplary apparatus includes a memory; a non-transitory computer readable medium including computer executable instructions; and at least one processor 16, coupled to the memory and the non-transitory computer readable medium, and operative to execute the instructions to be operative to: instantiate a classification module and an annotation generation module; obtain a segment of computer code; with the classification module, determine a required annotation category for the segment of computer code; with the annotation generation module, generate a natural language annotation of the segment of computer code based on the segment of computer code and the required annotation category; and provide the natural language annotation to a user interface for display adjacent the segment of computer code.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide:

ability to save human effort in manually writing the documentation for code, which is a tedious and labor-intensive task;

ability to enhance detection and correction of errors in computer code, such as in the data science field.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 shows exemplary classification of code annotations, according to an aspect of the invention;

FIG. 6 shows exemplary categories and stages of code (particularly applicable to data science) for classification purposes, according to an aspect of the invention;

FIG. 10 shows aspects of rendering code into an Abstract Syntax Tree (AST) structure, according to an aspect of the invention;

FIG. 13 shows exemplary categories of annotation, used in one or more embodiments of the invention;

FIG. 14 shows exemplary data science stages, used in one or more embodiments of the invention;

FIG. 15 shows an exemplary user interface, according to an aspect of the invention;

FIG. 18 summarizes three approaches for documentation generation, according to an aspect of the invention;

FIGS. 19, 20, and 21 show non-limiting experimental results achieved with one exemplary embodiment of the invention.

DETAILED DESCRIPTION

Figure 1:
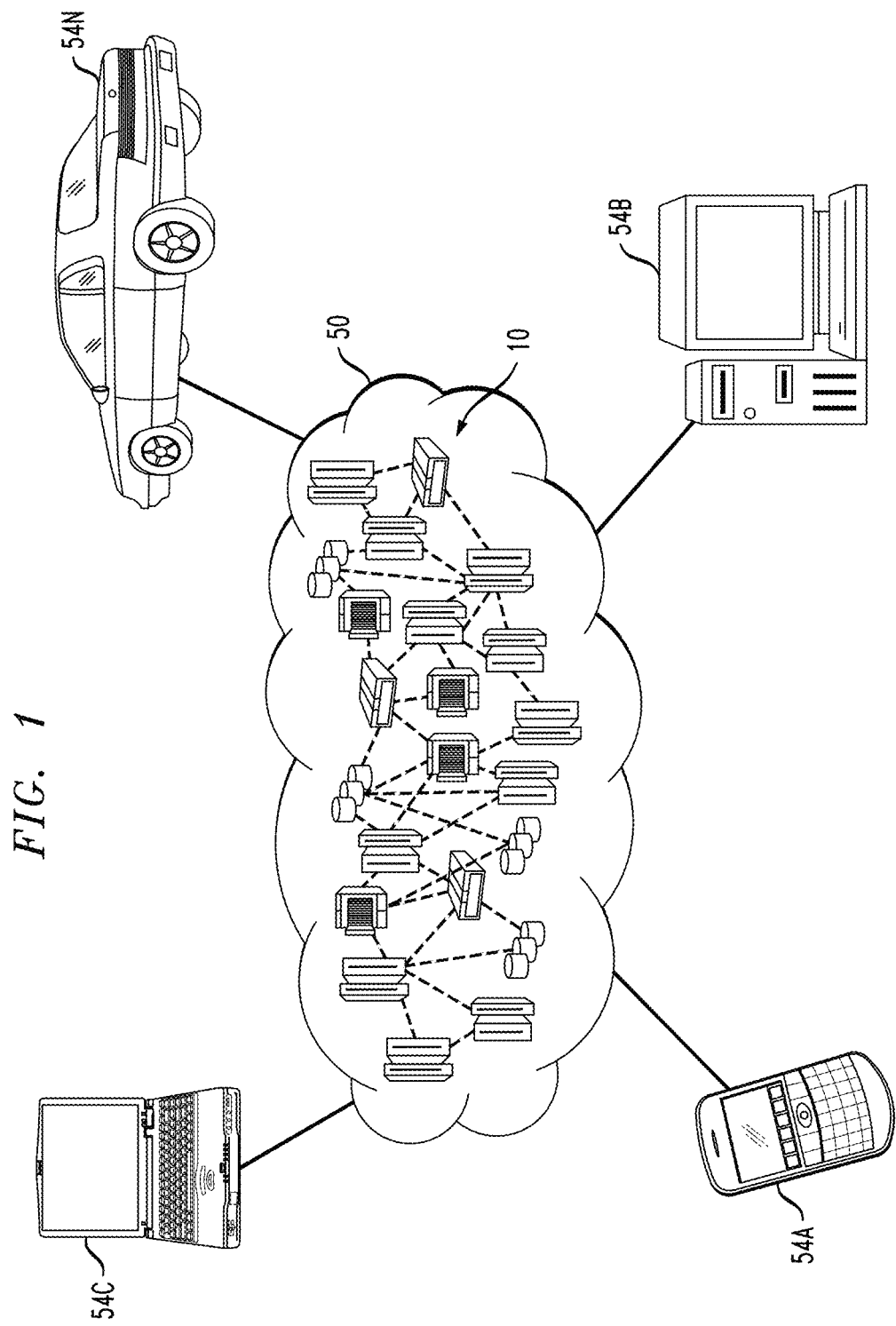
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
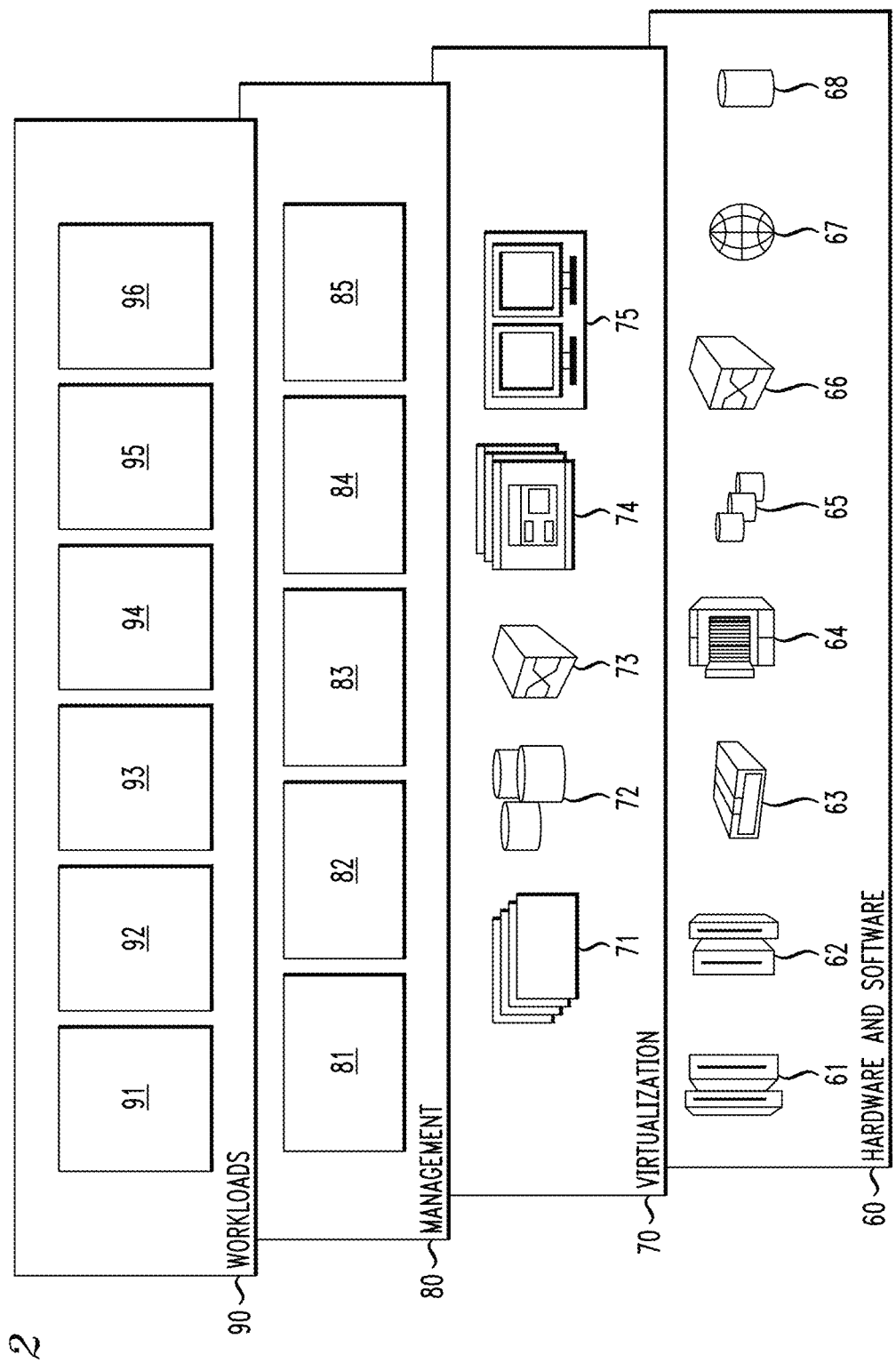
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 (or one or more elements thereof) to provide learning-based automated machine learning code annotation with a graph neural network.

Aspects of the invention provide learning-based automated machine learning code annotation with a graph neural network. One or more embodiments relate to human-computer interaction, artificial intelligence (AI), automatic machine learning, and/or data science. In machine learning aspects of data science, data scientists are asked to develop models, write code, and make presentations to present the model, code, and results to one or more domain experts. A pertinent goal for automated machine learning predictive systems is to mimic the expertise and workflow of data scientists. The expertise of a human data scientist is valuable, for example, from three aspects:

Knowledge about the particular data science problem domain and dataset;

Insights about the choice of models (a data scientist typically considers a handful of models selected by prior knowledge); and Insight Presentation—the decisions and the machine learning results are presented to non-technical strategy analysts and business managers.

We have found that the combination of these three factors advantageously leads to achieving high accuracy and explainability in a timely manner. Most current automated ML systems mimic only the technical expertise of data scientists and stop at insights generation but do not cover insight presentation. In contrast, one or more embodiments provide an automated system which mimics the data scientists' expertise, including their insights and presentation of insights, and can automatically generate annotations for the process regarding how data is processed, choices made in the process, and rationale why such choices were made.

Figure 3:
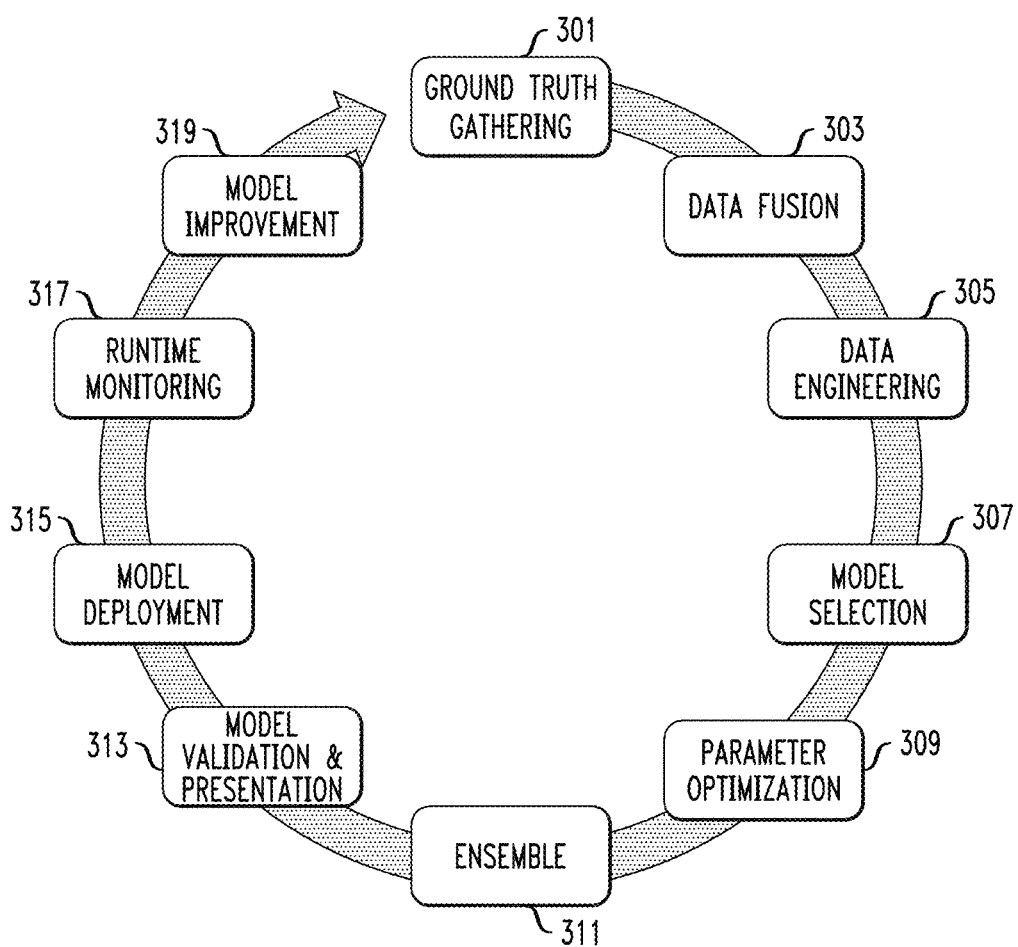
FIG. 3 shows a machine learning pipeline, as known from the prior art, which can be improved using aspects of the invention.

FIG. 3 shows an exemplary machine learning (ML) pipeline; ML includes the use of programs and algorithms to automate the end to end human-intensive and otherwise highly skilled tasks involved in building and operationalizing one or more AI models. At 301, engage in ground truth gathering. At 303, carry out data fusion. At 305, carry out data engineering. At 307, select one or more models. At 309, carry out parameter optimization, while at 311 ("ensemble"), assemble multiple model pipelines into a single one. Model validation and presentation are shown at 313; one or more embodiments can enhance this phase of the process. At 315, deploy one or more validated models; at 317, monitor the running models; and at 319, improve the model(s) as appropriate (for example, based on the runtime monitoring).

Figure 4:
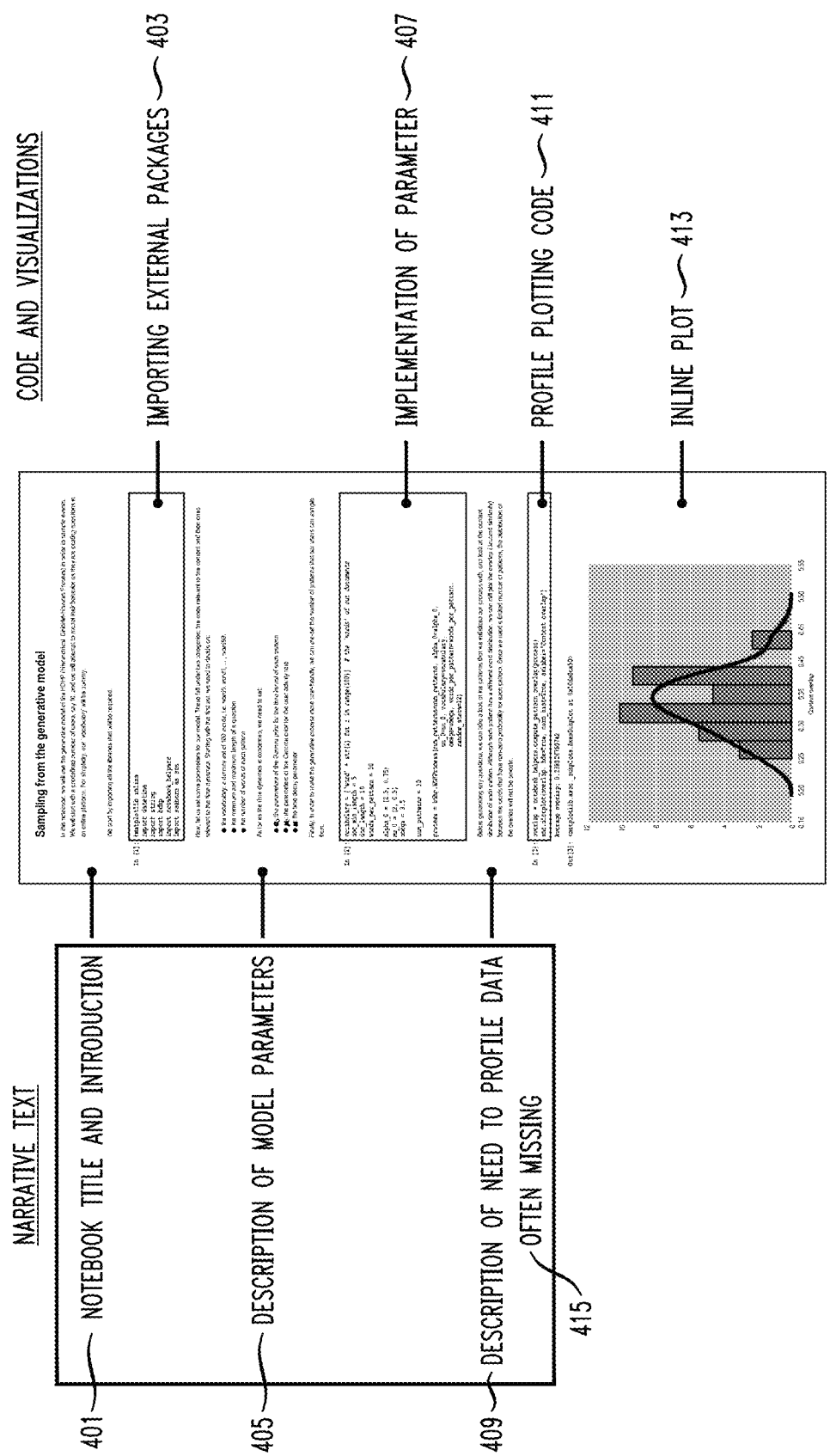
FIG. 4 shows a computational notebook, as known from the prior art, which can be improved using aspects of the invention.

Heretofore, human engineers have manually carried out step 313; one or more embodiments automate this step. FIG. 4 shows a computational notebook (for a non-limiting sampling and plotting example) as typically prepared by a data scientist, including elements 403, 407, 411, and 413 on the right, reflecting aspects of code and visualization typically carried out by scientists and/or engineers. Elements 403, 407, 411, and 413 on the right include, respectively, importing external packages, implementation of parameters, the actual profile-plotting code, and the resultant inline plot. Elements 401, 405, and 409 are corresponding narrative text, which, as indicated at 415, are often not produced by the scientists or engineers. Elements 401, 405, and 409 on the left include, respectively, the notebook title with an introduction, a description of the model parameters, and a description of the need to profile data. Comments should generally include, for example, why certain code was generated, what other options were tried, the significance of the results, and the like. The often-missing information 415 is actually quite useful to later understanding of the code by the coder or others, as well as for the generation of presentation(s) about the code.

One or more embodiments provide techniques to automatically generate comments such as seen at 415. Code annotation requirements may be different for data scientists than for typical engineering or technical/scientific problems. For example, consider that a supermarket owner may request a data scientist to predict the next quarter's revenue. The supermarket owner may want to know not merely the predicted number, but also the basis for the number, and the confidence score for the number, so as to feel comfortable with the prediction and to be able to estimate how much risk there might be in acting on the prediction. Accordingly, adequate documentation/commenting may be more important in data science applications than in typical engineering or scientific applications.

Annotations of code can be broken down into different classes. Referring to FIG. 5, non-limiting examples of such classifications include a description of the present process at 501 (i.e. the lines of code following load data) and an interpretation of results at 503. One or more embodiments collect hundreds or thousands of robustly documented notebooks (documented/commented by human experts) and use same as baseline role models for training. FIG. 6 shows two dimensions of example labels 601, 603 for the various annotations in the role models. Labels 601 e.g., process, alternative, result, . . . are labels for categories of code while labels 603 e.g. data loading, data profiling and exploratory data analysis, . . . are labels for stages of the computation process. Explanations of labels 601, 603 are presented at 605, 607, respectively. FIG. 6 is exemplary and other embodiments could use different categories and/or different numbers of categories, and/or different stages and/or different numbers of stages.

Figure 7:
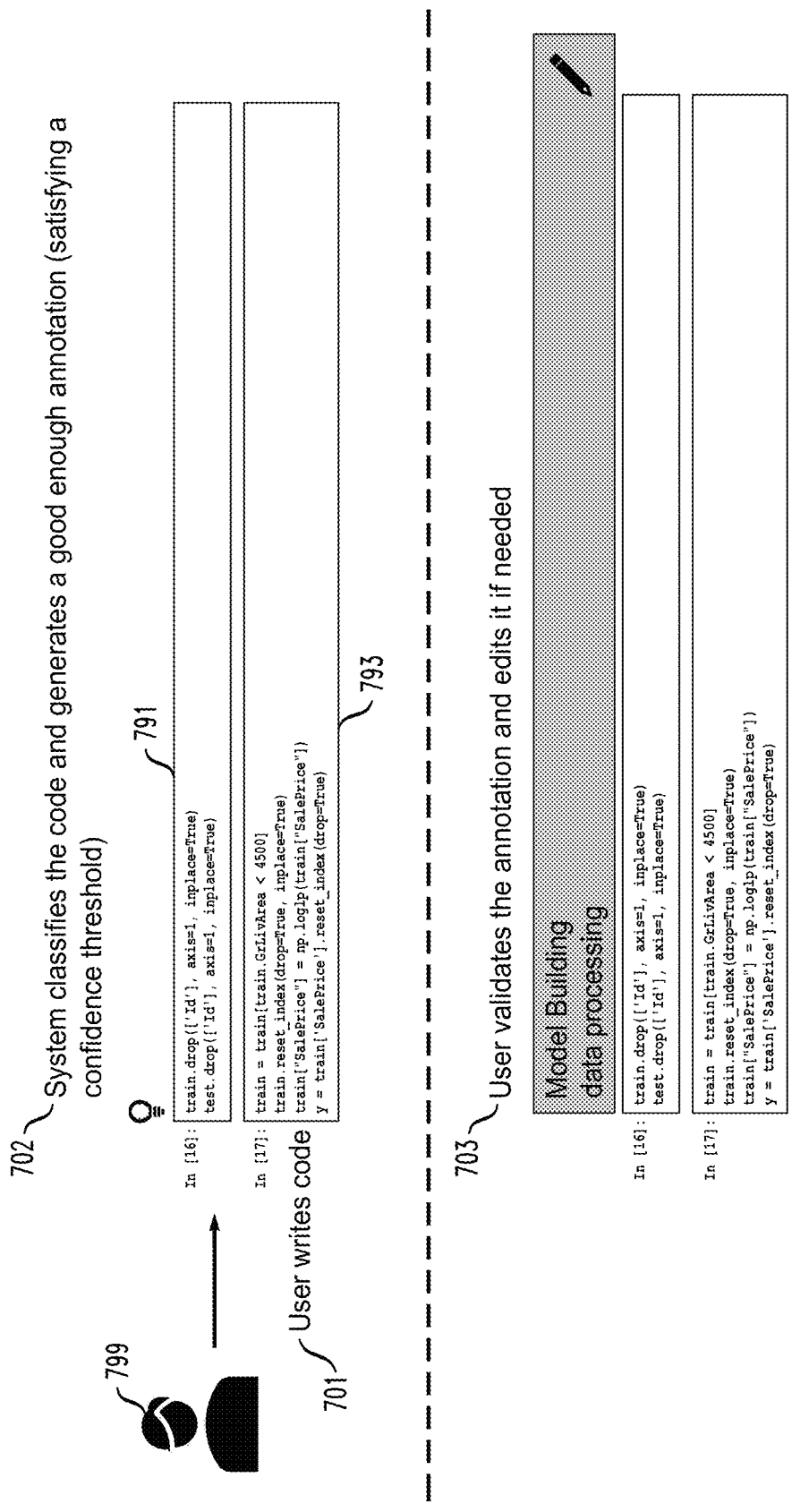
FIG. 7 shows exemplary user interaction with a user interface (UI), according to an aspect of the invention.

FIG. 7 shows exemplary user interactions with a system in accordance with aspects of the invention. At 701, the user 799 writes code. Here, there are two blocks of code, namely, 791 and 793. At 702, the system uses machine learning to automatically identify and classify the user-written code 791, 793. The system calculates labels for those segments. The example labels are shown at 703; e.g., here, "model building" and "data processing." These can be presented to the user 799 for validation and/or editing as needed.

Figure 8A:
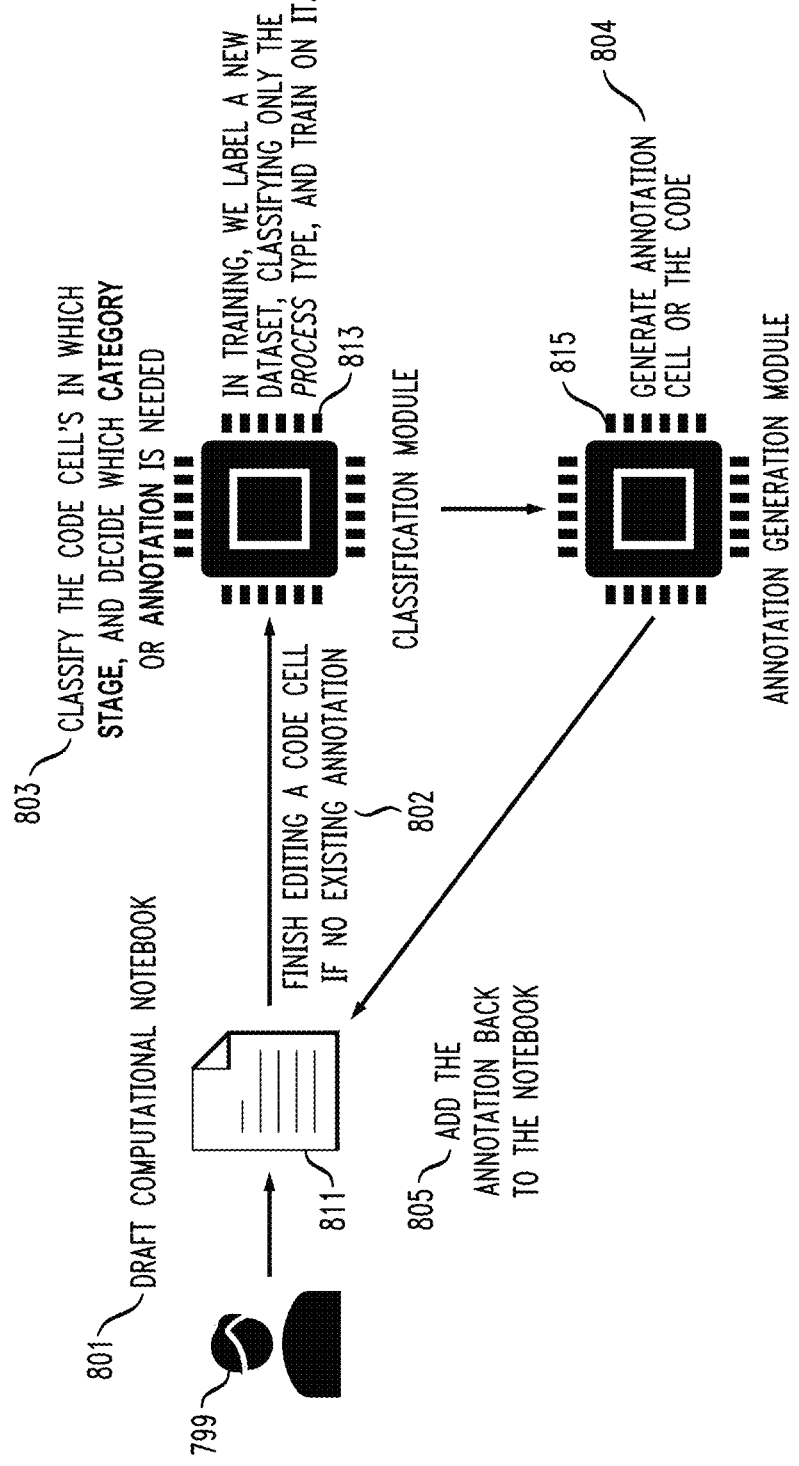
FIG. 8A is a combined block diagram and data flow diagram, according to an aspect of the invention.
Figure 8B:
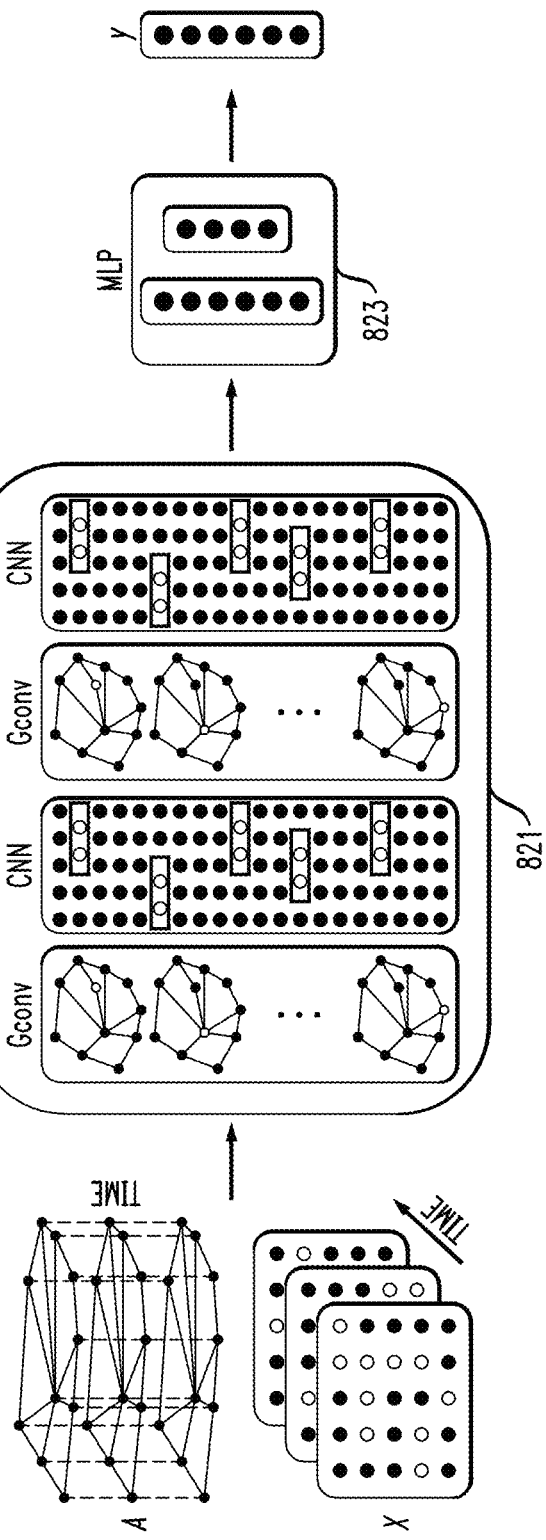
FIG. 8B shows exemplary annotation generation module training, according to an aspect of the invention.

FIGS. 8A and 8B show a combined block diagram and data flow diagram for an exemplary system according to an aspect of the invention. At 801, user 799 drafts a computational notebook 811. At 802, when the user finishes editing a given code cell, the same is sent to classification module 813. In one or more embodiments, regarding the notation "if no existing annotation" at 802, detect whether there is already pre-generated or pre-written annotation; if so, the algorithm does not trigger. Rather, the system/algorithm only steps in when it sees that annotation is missing. At 803, use deep learning via classification module 813 (e.g., long short-term memory LSTM) to classify the code cells with regard to stage (see FIG. 6) and also determine what category of annotation is needed. The tags/labels together with the raw code sequence are fed into the annotation generation module 815. The tags/labels significantly increase the performance/accuracy of the generated annotations. In step 804, use deep learning via module 815 to generate the annotations. In step 805, return the generated annotations back to a user interface of notebook 811.

When training classification module 813, label a new dataset, classifying only the Process type, and train on it. In one or more embodiments the classification module 813 is implemented using a conventional classifier such as an LSTM. During a training phase, module 813 is trained using the collected well-documented notebooks: the source code from the well-documented notebooks is input, and the expert-labeled stage/categories as output. Once trained, module 813 takes code as input and determines the corresponding stage/category.

Refer now also to FIG. 8B; as seen therein, the code sequence is input, and such code sequence is also abstracted into an Abstract Syntax Tree (AST) structure as input graph (A), and the code sequence embedding (X), with the annotation as output (y), when training generation module 815. Note the exemplary graphical structure and use of convolutional neural networks (CNN) at 821, and exemplary use of a multilayer perceptron (MLP) at 823.

Figure 9:
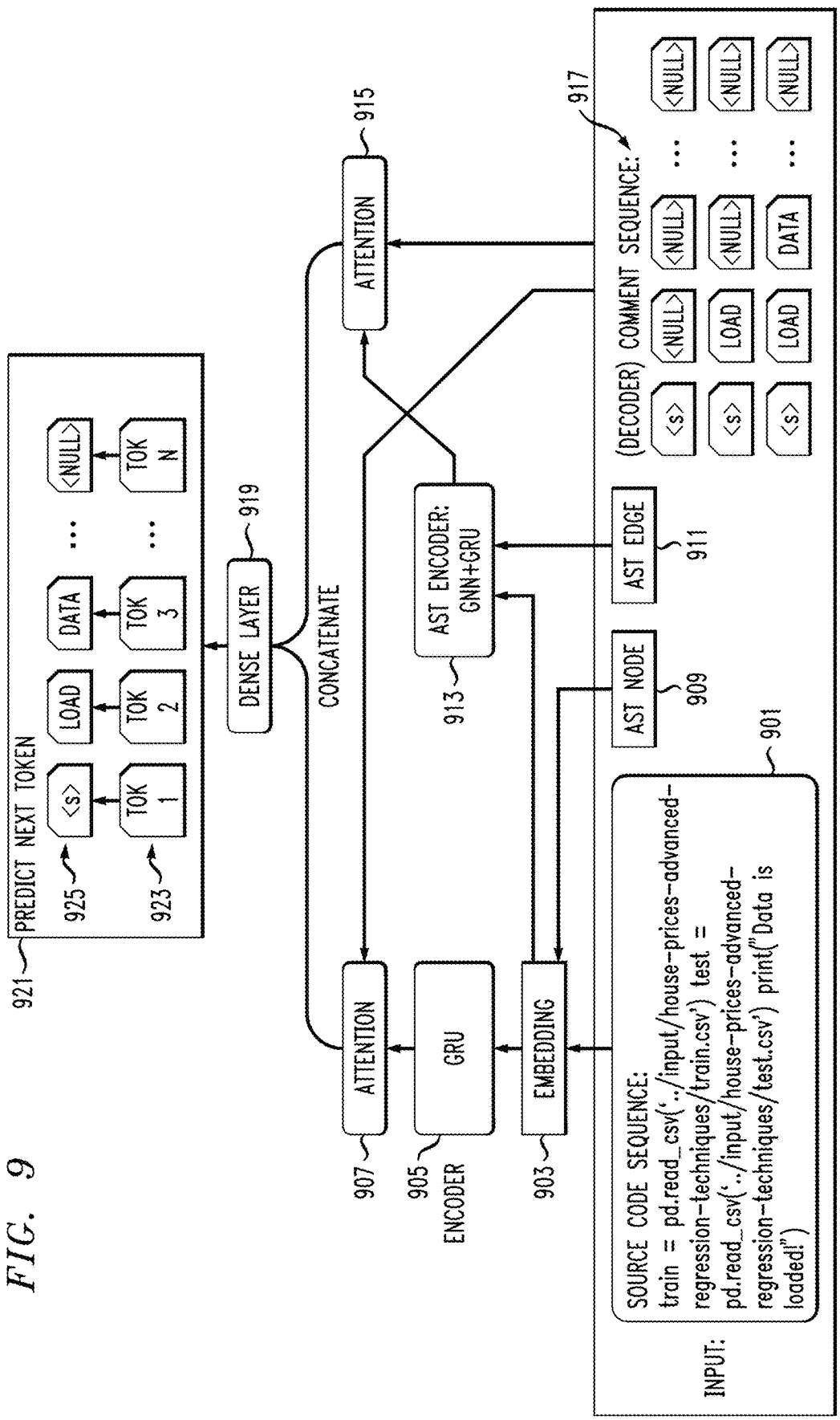
FIG. 9 shows a detailed architecture of an annotation generation module, according to an aspect of the invention.

FIG. 9 shows an exemplary implementation of module 815. At 901, begin with the indicated source code sequence to generate embedding 903; the source code is also used to generate AST node(s) 909 and AST edge(s) 911. Comment sequence 917 is the target that it is desired to generate. First, train the model using as ground truth the code and corresponding comments obtained from the human experts as discussed above; i.e., during training, the comment sequence from the human experts is available as input for training, while during actual use the appropriate comments are generated by the system.

FIG. 10 is an illustration of how AST node 909 and edge 911 look. At the top, "Program" is a (root) node, while "type," "start," and "end" are second-level nodes in the tree. The skilled artisan will appreciate that an abstract syntax tree (AST) is a well-known concept in computer science, namely, a tree representation of the abstract syntactic structure of source code written in a programming language. Each node of the tree denotes a construct occurring in the source code. The nodes are connected by edges or branches in a well-known manner.

Thus, embedding 903 is obtained from source code sequence 901 as well as the nodes 909 of the AST graph obtained from the source code. Embedding 903 is provided to Gated recurrent unit (GRU) 905, the output of which is provided to attention block 907. As will be appreciated by the skilled artisan, "attention" is a known technique in neural networks to both align and translate; further, an "embedding" is a relatively low-dimensional space into which high-dimensional vectors can be translated. Embeddings make it easier to do machine learning on large inputs such as sparse vectors representing words; an embedding can capture some of the semantics of the input by placing semantically similar inputs close together in the embedding space. An embedding can be learned and reused across models. Meanwhile, the embedding 903 and AST edges 911 are provided to the AST encoder 913 (which employs, e.g., a Graph Neural Network (GNN) plus a GRU. The output of same is provided to another attention block 915 together with comment sequence 917 (as will be discussed below with respect to FIG. 17A, during model building, an embedding 918 of sequence 917 can be passed to another GRU 920 and then to attention block 915). The outputs of the two attention blocks are concatenated into dense layer 919 (the skilled artisan is familiar with dense or fully connected layers in neural networks) and at 921, it is desired to predict the next token. A series of tokens 923; e.g., tokens 1, 2, 3, . . . , N are shown with their corresponding values 925 e.g. <s>, Load, Data, . . . , <NULL>. Thus, the system shown in FIG. 9 is trained on the training data with the source code as input, and the raw annotation sentences as output, and once trained is used to determine the unknown code annotations.

Thus, one or more embodiments provide users with automatically generated variations of annotation regarding the data science code in the appropriate context of workflow (taking advantage of the AST tree), in a computational notebook environment. In one or more embodiments, the training step abstracts the code into a graph structure (e.g. AST tree), and leverages the state-of-the-art Graph Neural Network technique to improve the model performance. Advantageously, one or more embodiments provide an automated code annotation system applicable to a machine learning and data science workflow, to address the ill-documented code problem, and/or leverage the latest neural-network based learning architecture to generate state-of-the-art performance.

In addition to assisting with robust code documentation, one or more embodiments can be used, for example, to detect problems in the code, based on the generated documentation, and to update the code to correct the problems. It will be appreciated that the source code can be edited to mitigate the detected problem and the edited source code can be recompiled/re-interpreted; the resulting machine-executable corrected code can then be used to do some computational task, control a physical system, etc. One or more embodiments also provide a novel UI.

One or more embodiments thus provide techniques using a computing device for automatically generating natural language annotations of a segment of programming code in the process of a machine learning and data science workflow, considering user input. One step includes receiving, by a computing device, from a user, the source code as an input sequence. A further step includes, in a training step, taking the input code sequence, and the output sequence of natural language as the annotation for the input code sequence. An even further step includes, in an inferencing step, taking the input code sequence, and generating an output sequence of natural language as the annotation. A still further step includes injecting the generated natural language annotation into the appropriate location next to the input code sequence in a computational notebook, and exporting the new version of the computational notebook with code and annotation(s).

One or more embodiments provide automated documentation generation in computational notebooks. As noted above, computational notebooks allow data scientists to express their ideas through a combination of code and documentation. However, data scientists often pay attention only to the code, and neglect creating or updating their documentation during quick iterations, which leads to challenges in sharing their notebooks with others (and even to understanding their own notebooks when referring to them again in the future). One or more embodiments provide an automated documentation generation system for computational notebooks. This system advantageously facilitates documentation creation through three approaches: a deep-learning-based approach to generate documentation for source code; a query-based approach to retrieve the online API documentation for source code; and a user prompt approach to motivate users to write more documentation.

We experimentally evaluated an exemplary embodiment in a within-subjects experiment with 24 data science practitioners. We found that automated documentation generation techniques reduced the time for writing documentation, reminded participants to document code they would have ignored, and improved participants' satisfaction with their computational notebook at the end.

Documenting the "story" behind code and results is pertinent for data scientists to work effectively with others, as well as when they revisit their work in the future. The story, code, and computational results together construct a computational narrative. Unfortunately, data scientists often write messy and drafty analysis code in computational notebooks as they quickly test hypotheses and experiment with alternatives. It is a tedious process for data scientists to then manually document and refactor the raw notebook into a more readable computational narrative, and many people neglect to do so.

Many efforts have sought to address the tension between exploration and explanation in computational notebooks. For example, researchers have explored the use of code gathering techniques to help data scientists organize cluttered and inconsistent notebooks, as well as algorithmic and visualization approaches to help data scientists forage past analysis choices. However, these efforts focus on the post-hoc cleaning and organizing of existing notebook content, instead of supporting the creation of new content. A chat feature, which enables data scientists to have discussions in a notebook, has also been developed and links their chat messages as documentation to relevant notebook elements. However, chat messages are typically too fragmented and colloquial to be used for documentation; besides, in real practice it is not common that multiple data scientists work on the same copy of a notebook and actively message each other.

One or more embodiments consider factors that tend to make a well-documented notebook. To address this question, we randomly selected 80 well-documented publicly-available notebooks and analyzed their documentation practices. Through an iterative coding process, we identified nine categories of documentation content types (see FIG. 13) that data scientists add to a notebook (e.g., Reason and Process), which reflect the thought processes and decisions made by the author(s). Other examples have been discussed with respect to FIG. 6. One or more embodiments advantageously automate the process of crafting documentation, allowing the documentation task to be conducted by a joint human-AI team.

One or more embodiments provide an automated documentation generation system that integrates into the Jupyter® Notebook environment (an open-source web application, familiar to the skilled artisan, that allows the user to create and share documents that contain live code, equations, visualizations and narrative text; registered mark of NumFOCUS, Inc. Austin, TEXAS USA). One or more embodiments facilitate documentation creation through three distinct approaches: a deep-learning-based approach to automatically generate new documentation for source code; a query-based approach to retrieve existing documentation from online Application Programming Interface (API) websites for third party packages and libraries; and a prompt-based approach to encourage users to write documentation.

A within-subjects experiment with 24 data science practitioners was conducted. We found that an exemplary embodiment reduced the time for data scientists to create documentation, reminded them to document code they would have ignored, and improved their satisfaction with their computational notebooks. Meanwhile, the quality of the documentation produced with one or more embodiments was comparable to that which data scientists produced on their own.

Advantageously, one or more embodiments provide an empirical understanding of documentation practices through analysis of top-rated notebooks and/or an Artificial Intelligence (AI) system to support data scientists to create computational narratives, enabling them to produce human-level quality documentation in much less time than with prior-art techniques. Experimental results provide evidence that automatic documentation generation can improve data scientists' efficiency and perceived satisfaction with document writing.

Figure 11:
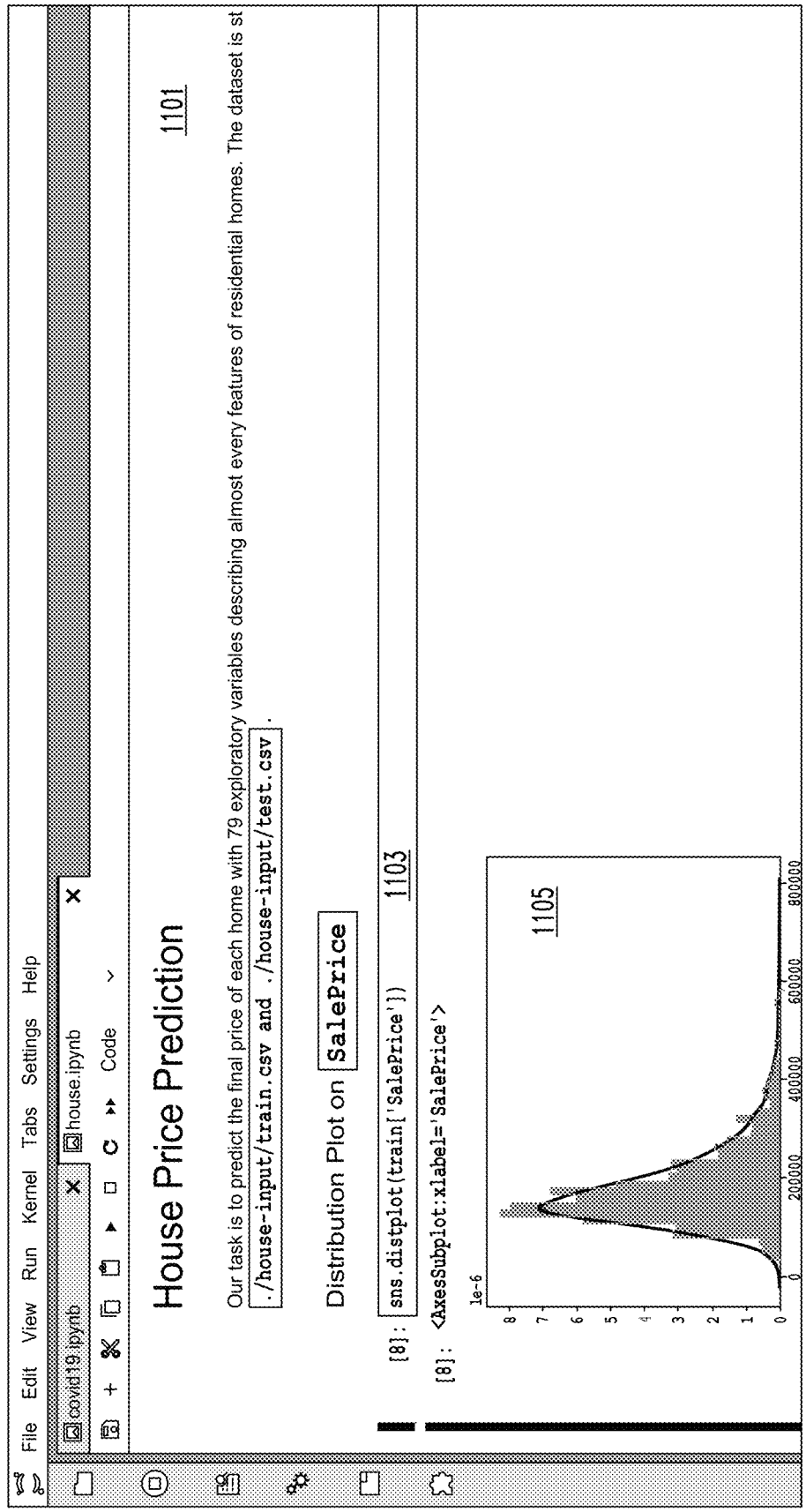
FIG. 11 shows an exemplary computational notebook that can be annotated according to aspects of the invention.

Computational notebooks allow data scientists to weave together a variety of media, including text explanations, graphs, forms, interactive visualizations, code segments, and their outputs, into computational narratives (as shown in FIG. 11). These computational narratives enable literate programming and allow data scientists to effectively create, communicate, and collaborate on their analysis work. Indeed, computational notebooks allow data scientists to create markdown cells, as at 1101, and code cells, as at 1103, and to view code output in the same environment, as at 1105. Together, the variety of media including text explanations, graphs, forms, interactive visualizations, code segments and their outputs—weaves into computational narratives. Heretofore, however, obtaining clear and complete notebooks has been challenging, inasmuch as documenting the many different alternatives that are typically considered will pose more workload to data scientists, sometimes even interfering with their cognitive process of coding, and may not be rewarding because many alternatives will be discarded in later versions.

Poor documentation hinders the readability and reusability of the notebooks that are shared with other collaborators (and even to understanding their own notebooks when referring to them again in the future). Recently, various groups of researchers have developed a wide range of tools to help data scientists to manage their "messy" computational notebooks. However, despite the wide variety of approaches to helping data scientists manage their notebooks, none of these tools directly aids data scientists in creating new, rich, descriptive contents to document their computational notebooks, and to improve the quality of the computational narrative. One or more embodiments advantageously provide a system to support data scientists to better document their code and to produce higher quality computational narratives.

Documentation plays an important role in software programming. Programmers write comments in their source code to make the code easier for both themselves and others to understand. Writing clear and comprehensive documentation is pertinent to software development and maintenance. However, writing documentation itself is a time-consuming task. Accordingly, documentation practices in open source communities are widely perceived to be of low quality.

To save time in creating documentation, template-based approaches are often used to help developers annotate their source code (e.g. tagging approaches). This approach helps programmers create documentation for others and works especially well for documenting application programming interfaces (APIs), where method signatures and variable types are important pieces of information and can easily be documented from tags. However, such methods may not work in the data science field due to the rapid, experimental nature of data science work, because data scientists may be particularly reluctant to create and maintain high-quality documentation of their work. Furthermore, these methods cannot capture other aspects of documentation important in data science, such as how a data set was constructed, the intent behind an analysis, or a description of why an experiment was successful (or not).

Recently, some researchers have put forth proposals for better documenting the specific artifacts involved in a data science workflow, i.e., the data set and the machine learning model; e.g., in line with what is called provenance, which refers to tracking what has been done with code and data over time—typically to aid reproducibility of results. However, this approach focuses more on the dataset and the model artifact in the final product of a data science project, supporting data scientists to create a "factsheet" for these artifacts for the non-technical consumers. In contrast, one or more embodiments support data scientists to better capture the documentation during the process of creating models and data science products, and such documentation, together with the code as a computational narrative, primarily for other technical users to understand and to reuse. One or more embodiments also advantageously link code with external documentation to help data scientists to create more usable documentation.

Automatic code summarization is a rapidly-expanding research topic in the Natural Language Processing (NLP) and ML communities. The automatic code summarization task is defined as taking a code snippet as input, and "translating" it into a natural language description of the code as output. Current sequence-to-sequence approaches do not work well in practice because source code is not just a stream of tokens. One or more embodiments provide neural-network-based automatic code summarization techniques to support document writing in computational notebooks. One or more embodiments include both automated documentation capability and a capability that allows users to directly manipulate the documentation.

We conducted a study into the makings of a "well-documented" computational narrative by looking into notebooks rated by a broader data scientist community, and analyzing their characteristics specifically around the documentation. We collected well-documented relevant publicly available notebooks prepared in the English language. We analyzed the collected notebooks at the cell level of granularity: the data scientist tasks (or stages) that the code cells perform (e.g., data cleaning or modeling training); and the purposes and types of content of markdown cells. In addition, we analyzed the distribution of code cells and markdown cells. Each coder independently analyzed the same six notebooks to develop a codebook. After discussing and refining the codebook, each coder again went back to recode the six notebooks and achieved pair-wise inter-rater reliability greater than 70% (Cohen's K). After this step, the five coders divided and coded the remaining notebooks.

We found that the well-done computational notebooks all contained rich documentation. In total, we identified nine categories for the content of the markdown cells (see FIG. 13 and other examples in FIG. 6). In addition, referring to FIG. 14, we found the markdown cells covered four stages and 13 tasks of the data science workflow. Note that a markdown cell may belong to multiple categories. See also other examples in FIG. 6.

Figure 12:
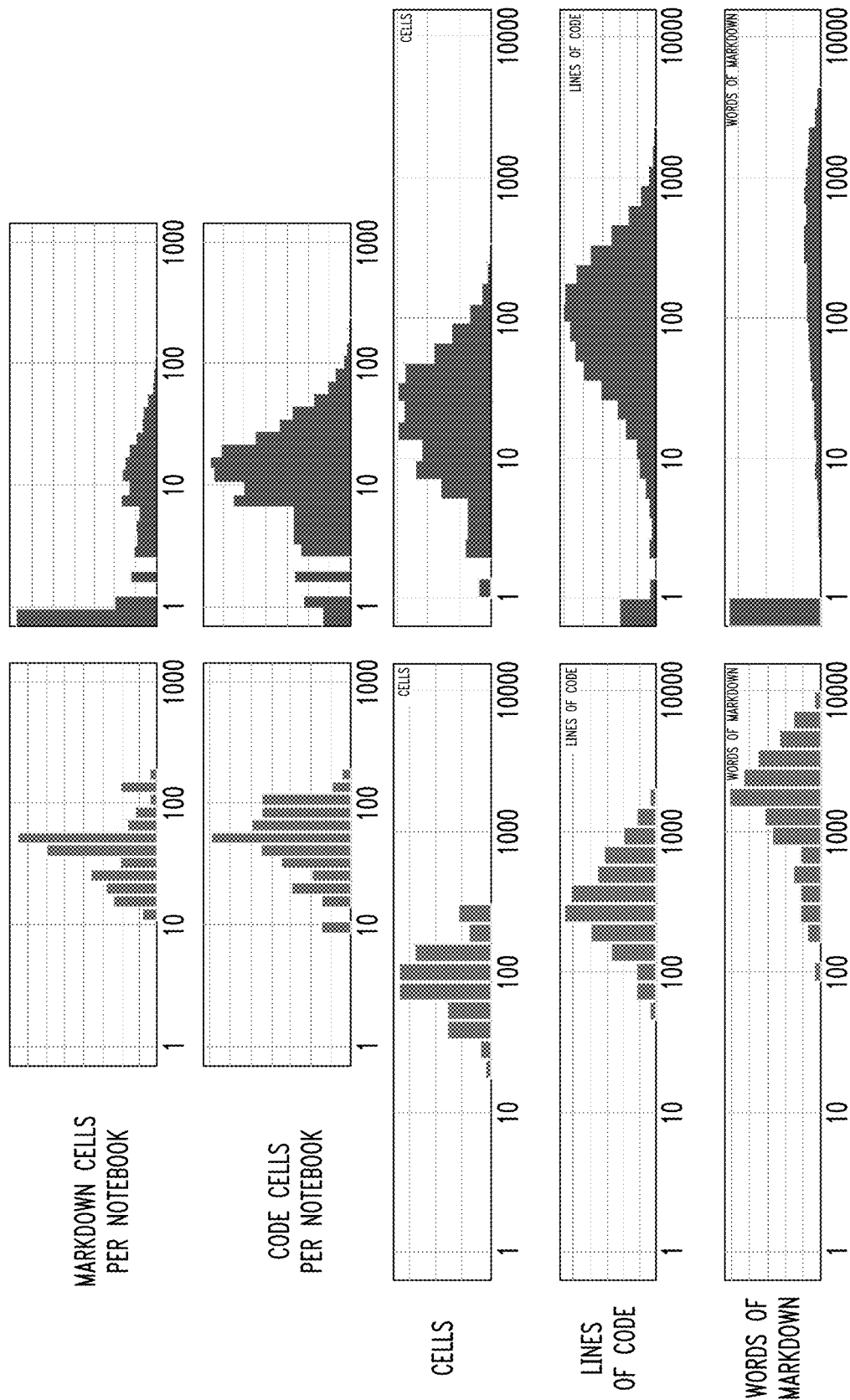
FIG. 12 shows a visualization of computational notebooks that can be used, for example, in training embodiments of the invention.

Descriptive statistics of the notebook: As shown in FIG. 12, the left side represents the descriptive visualization of a set of highly-voted computational notebooks (referred to as Sample A) and the right side represents the descriptive visualization of a large control group (referred to as Sample B). We found that the Sample A has more total cells per notebook (Median=95) than Sample B (Median=18). Sample A has a roughly equal ratio of markdown cells and code cells per notebook, while Sample B is unbalanced with the majority of cells being code cells. Notably, Sample A has more total words in markdown cells (Median=1728) than Sample B (Median=218). This result indicates that the notebooks of Sample A are better documented than general notebooks.

Use of markdown cells to document a broad range of topics: As shown in the table of FIG. 13, our analysis revealed that markdown cells are mostly used to describe what the adjacent code cell is doing. In addition to the process category, markdown cells are used to specify a headline for organizing the notebook into separate functional sections and for navigation purposes. Markdown cells can also be used to explain beyond the adjacent code cells. We found that many markdown cells are created to describe the outputs from code execution, to explain results or critical decisions, or to provide an outline for the readers to know what they are going to do in a list of to do actions, and/or to recap what has been done so far (Summary). Such cells are also used to explain what a general data science concept means, or how a function works (Education), or are connected with external references for readers to further explore the topics (Reference).

Data science stages. Referring to FIG. 14, we coded markdown cells based on where they belong in the data science workflow and identified four stages and 13 tasks. The four stages include environment configuration (4.50%), data preparation and exploration (37.05%), feature engineering and selection (10.40%), and model building and selection (27.57%). In particular, notebook authors create more markdown cells for documenting exploratory data analysis tasks (26.62%) and model training tasks (10.45%). The rest of the markdown cells are evenly distributed along with other tasks. A markdown cell may belong to one category, to multiple categories, or to no categories; and to one stage, to multiple stages, or to no stages.

Our analysis of markdown cells in well-documented notebooks suggests that data scientists document various types of content in a notebook, and the distribution of these markdown cells generally follows an order of the data science lifecycle, starting with data cleaning, and ending with model building and selection. Based on these findings, we developed the following actionable design considerations, which are addressed by one or more embodiments:

The system should support more than one type of documentation generation. Data scientists benefit from documenting not only the behavior of the code, but also interpreting the output, and explaining rationales. Thus, a good system should be flexible to support more than one type of documentation generation.

Some types of documentation are highly related to the adjacent code cell. We found at least the Process, Result, Reason, and Reference types of documentation are highly related to the adjacent code cell. To automatically generate interpretations of results or rationale(s) for a decision may be hard, as both involve deep human expertise. However, using the latest neural network algorithms, one or more embodiments provide an automation system to generate the Process type of documentation, that can also retrieve the Reference for a given code cell.

There are certain types of documentation that are irrelevant to the code. Various types of documentation do not have a relevant code piece upon which the automation algorithm can be trained. Together with the Reason and Result types, one or more embodiments also provide a function such that the human user can easily switch to the manual creation mode for these types of documentation.

Different types of documentation can be at the top or the bottom of the related code cell. This design insight is particularly pertinent to the Process, Result, and Reason types of documentation. It may be less preferable to put Result documentation before the code cell, where the result is yet to be rendered. One or more embodiments are flexible to render documentation at different relative locations to the code cell.

External resources such as Uniform Resource Locators (URLs) and the official API descriptions may also be useful. Some types of documentation, such as Education and Reference, are not easily generated with neural network (NN)-based models, but they are easy to retrieve from the Internet. One or more embodiments incorporate the capability to fetch relevant web content as candidate documentation.

There is an ordinality in markdown cells that is aligned with the data science project's lifecycle. One or more embodiments consider that Library Loading types of cells are often at the beginning section of the notebook, and the Model Training type of content may be more likely to appear near the end of the notebook.

It is desirable that the notebook has documentation with a problem overview at the beginning and a summary at the end. One or more embodiments provide a problem overview as a markdown cell at the top of the notebook.

One or more embodiments provide an automatic documentation generation system that supports data scientists in writing better-documented computational narratives. One or more embodiments include two components: a client-side User Interface (UI) implemented as a Jupyter Notebook plugin using TypeScript code (Refer to FIG. 15), and a server-side backend that is implemented as a server using Python and the Flask Python programming library. The client-side program is responsible for rendering the user interface, and also for monitoring the user's actions on the notebook regarding edits in code cells. When the user's cursor is focused on a code cell, the UI will send the current code cell content to the server-side program through Hypertext Transfer Protocol (HTTP) requests. Referring to FIG. 15, an exemplary user interface is implemented as a JUPYTER Notebook plugin. At 1501, when the recommended documentation is ready, a lightbulb icon shows up to the left of the currently-focused code cell. Elements 1503, 1505, and 1507 show the three options in the dropdown menu. At 1503, a documentation candidate is generated for the code with a deep-learning model; at 1505, a documentation candidate is retrieved from the online API documentation for the source code; and at 1507, a prompt message "nudges" users to write documentation on a given topic.

The server-side program takes the code content and generates documentation using both the deep-learning-based approach and the query-based approach. For the deep-learning-based approach, the server-side program first tokenizes the code content and generates the AST. It then generates the prediction with the pre-trained model. For the query-based approach, the server-side program matches the curated API calls with the code snippets and returns the pre-collected descriptions. For the prompt-based approach, the server-side program sends the prompt-based on the output type of the code cell.

FIG. 15 thus shows an exemplary user interface as a JUPYTER Notebook plugin. Each time the user changes her or his focus on a code cell, as she or he may be inspecting or working on the cell, the plugin is triggered. The plugin sends the user-focused code cell's content to the backend. Using this content, the backend generates a code summarization using the model and retrieves a piece of documentation from the API webpage. When such a documentation generation process is completed, the generated documentation is sent from the server-side to the frontend, and a light bulb icon appears next to the code cell, indicating that there are recommended markdown cells for the selected code cell (as shown at 1501).

When a user clicks on the light bulb icon, he or she can see three options rendered in the dropdown menu: (1) a deep-learning-based approach to generate documentation for source code (see 1503); (2) a query-based approach to retrieve the online API documentation for source code (see 1505); and (3) a user prompt approach to nudge users to write more documentation (see 1507). If the user likes one of these three candidates, she or he can simply click on one of them, and the selected documentation candidate will be inserted into above the code cell (if it is the Process, Reference, or Reason type), or below it (if it is the Result type).

Three different non-limiting exemplary approaches for documentation generation will now be presented. FIG. 18 summarizes the three approaches for documentation generations implemented in an exemplary embodiment. The three different approaches are advantageous in one or more embodiments because, for example:

It is desirable that the system should be able to generate multiple types of documentation; e.g., support for Process, Result, Education, Reason, and Reference is desirable.

Some types of documentation, as discussed, are not relevant to the code cell; thus, automation approaches are not suitable to generate same. Accordingly, one or more embodiments include a prompt-based approach 1805 for Result, Education, and Reason.

The deep-learning-based approach 1801 is currently believed to be most suitable for generating the Process type of documentation. However, the Reference type typically does not need a learning-based approach, and can be achieved with a traditional query-based approach 1803.

Deep-Learning-Based Approach. We trained a deep learning model using the GNN architecture proposed by Alexander LeClair, Sakib Haque, Lingfei Wu, and Collin McMillan, Improved code summarization via a graph neural network, arXiv preprint arXiv:2004.02843 (2020), as will be familiar to the skilled artisan. We chose to use the GNN architecture as this model of LeClair et al. has state-of-the-art performance to generate source code summarizations for Python code. These GNN models can take both the source code's structure (extracted as AST) and the source code's content as input. Thus, this approach outperforms the traditional sequence-to-sequence model architectures, which only takes the source code's content as an input sequence.

Figure 16:
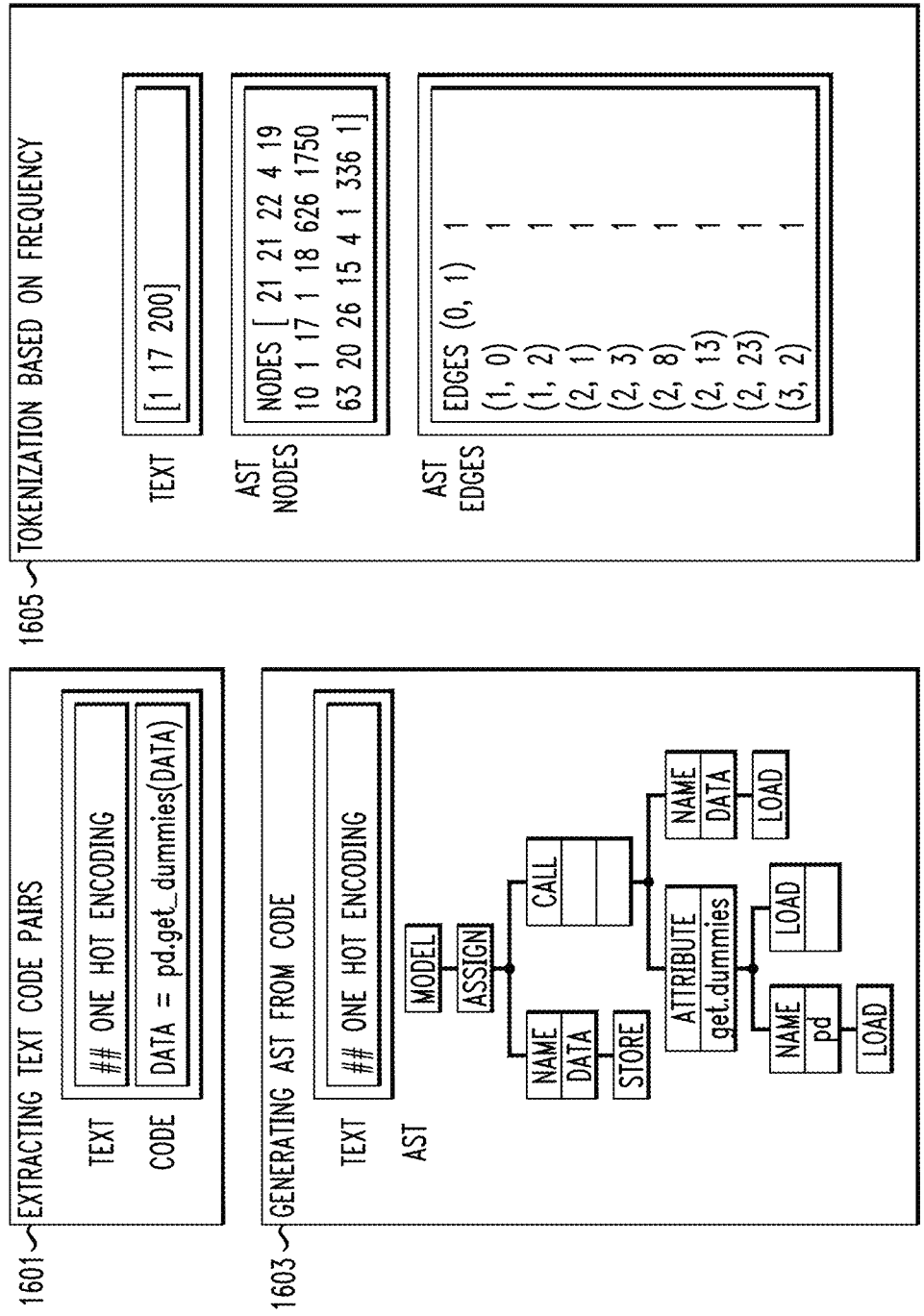
FIG. 16 shows aspects of rendering code into an Abstract Syntax Tree (AST) structure, according to an aspect of the invention.

As detailed in FIGS. 16. 17A, and 17B, one or more embodiments implement a pipeline that can preprocess the input data and train the GNN with the collected notebook data. In one or more embodiments, it is used later together with the trained model to make inferences in the server backend.

As seen at 1601, to construct a large training data set, first extract code cells and the markdown cells above ("text") as a pair of input and output (similar to the data collection approach in Rajas Agashe, Srinivasan Iyer, and Luke Zettlemoyer, Juice: A large scale distantly supervised dataset for open domain context-based generation, arXiv preprint arXiv: 1910.02216 (2019)), which will be familiar to the skilled artisan. If there is an inline comment in the first line of the code cell, also create a pair using the inline comment as the output. In total, our experimental dataset has thousands of pairs of (i) code and (ii) the code's corresponding documentation. Following the best practice of model training, in our experiments, we split the dataset into training, testing, and validation subsets with an 8 to 1 to 1 ratio.

Then for all the training data, one or more embodiments include three steps of pre-processing, as illustrated in FIG. 8A. Step 803 removes the style decoration, formats, and special characters of the documentation output. Step 1603 in FIG. 16 generates an AST for the source code input. Step 1605 tokenizes source code input as a sequence of tokens, the AST nodes as a sequence of tokens and a matrix of edges, and the output documentation as a sequence of tokens as well. All the tokens are then transformed into a word embedding vectors of real numbers. In our experiments, we trained our models for 100 epochs, a batch size of 30, and 15 early stop points. We selected the model with the highest validation accuracy score. FIG. 16 thus shows a code summarization model for the deep-learning-based documentation generation approach via GNN; at 1601, extract text code pairs from existing notebooks; at 1603, generate AST from code; and at 1605, tokenize each word and translate the words into embeddings.

Figure 17A:
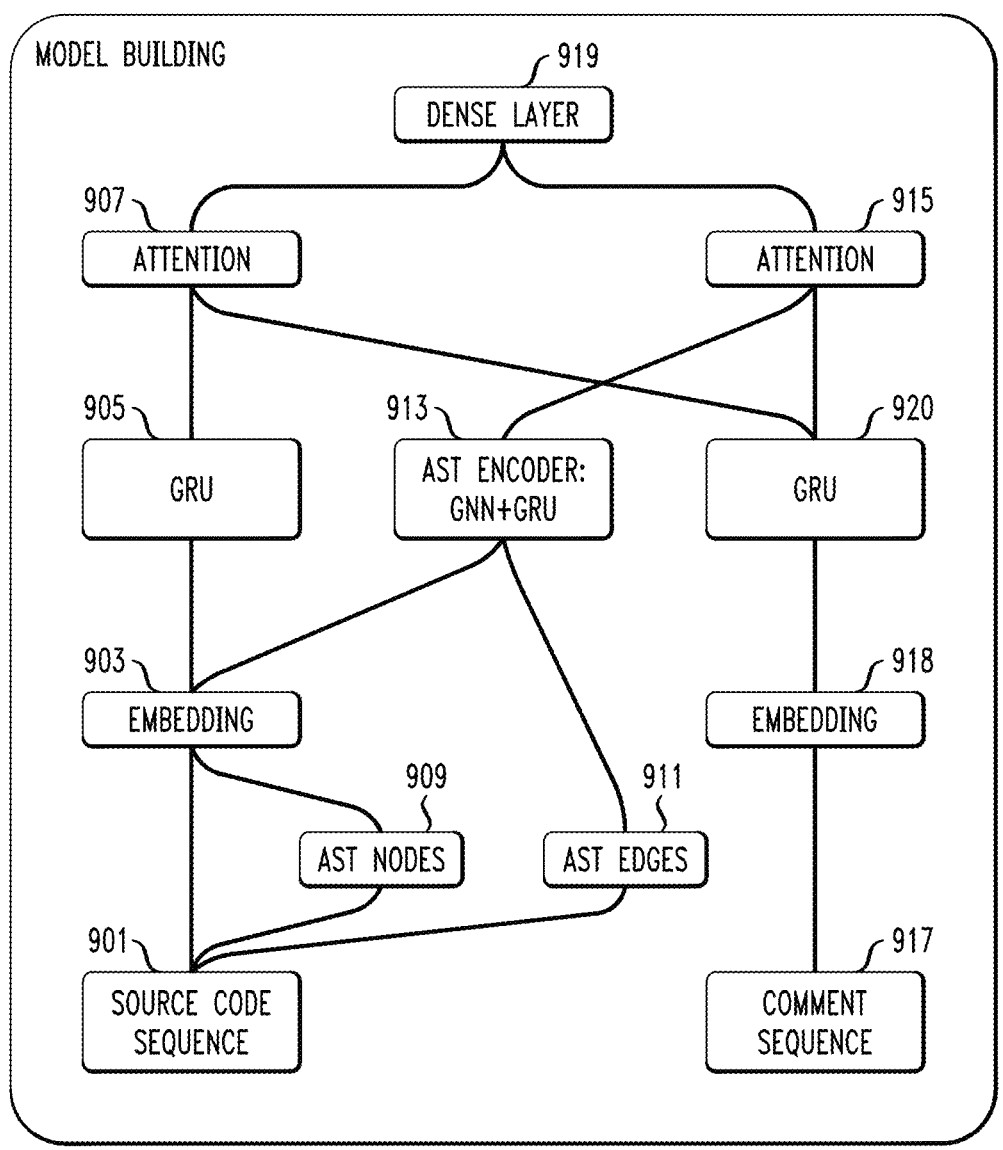
FIG. 17A shows an alternative view of detailed architecture of an annotation generation module, according to an aspect of the invention.

FIG. 17A shows an exemplary GNN model architecture, similar to that shown in FIG. 9, useful for implementing element 815 in FIG. 8A. During model building, an embedding 918 of sequence 917 can be passed to another GRU 920 and then to attention block 915. FIG. 16 is similar to FIG. 10 (in the sense that it shows the generation of the AST from the code). Furthermore, FIG. 18 (mentioned below) is similar to FIG. 15, where FIG. 15 shows the three options in the UI, while FIG. 18 depicts conceptual ideas.

We performed a preliminary evaluation of the model's output using BLEU scores, as will be familiar to the skilled artisan. BLEU scores are used to quantitatively evaluate model performance. BLEU scores are commonly used in the source code summarization literature to evaluate the similarity between the generated text and the ground truth text. One exemplary embodiment achieves a BLEU-a=11.41, which is an acceptable score for our task.

Figure 17B:
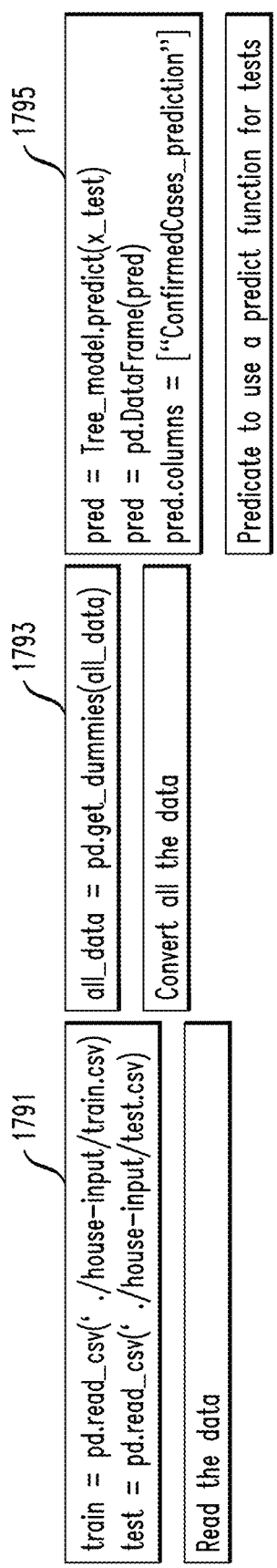
FIG. 17B shows example output from the model, according to an aspect of the invention.

Several example outputs from the trained model are shown in FIG. 17B. From the qualitative analysis of these generated documentation pieces, it is believed that they are adequate for our experimental system; element 1791 shows a case where the generated text well describes the code; element 1793 shows a case where the generated text vaguely describes the code; and element 1795 shows a case where the generated text is poorly readable, but still captures the keywords of the descriptions.

Query-Based Approach. Our review of well-documented code indicated that descriptions of common data science methods are frequently captured in well-documented notebooks for educational purposes. In some instances, data scientists directly paste in a link or a reference to the external API documentation for a code function. One or more embodiments implement a query-based approach that curates a list of APIs from commonly used data science packages, and the short descriptions from external documentation sites. We collected both the API names and the short descriptions by building a crawling script with Python. When users trigger this query-based approach for a code cell, one or more embodiments match the API names with the code snippets and concatenate all the corresponding descriptions.

Prompt-Based Approach. One or more embodiments also provide a prompt-based approach that allows users to manually create the documentation. We have found that a well-documented notebook not only describes the process of the cell, but also describes and interprets the output, explains reasons for decision making, and describes alternative solutions. A prompt-based approach according to one or more embodiments detects whether the code cell has an output or not. If it has an output, the system assumes that the user is more likely to add interpretation for the output result; thus, the corresponding prompt will be inserted below the code cell. Otherwise, the system assumes that the user may want to insert a reason or one or more educational types of documentation; thus, it changes its prompt message.

FIG. 18 shows a summary of the three approaches for documentation generation in one or more embodiments; approaches 1801, 1803, 1805 are discussed elsewhere herein.

Experimental Results

To evaluate the usability of an exemplary embodiment and its effectiveness in supporting data scientists to create well-documented notebooks, we conducted a within-subject controlled experiment with a diverse group of 24 data scientists with varying job descriptions and levels of experience. The task was to add documentation to a given notebook. Each participant was asked to finish two sessions, one with the exemplary embodiment's support and one without its support. The evaluation aimed to understand (1) how well the exemplary embodiment can facilitate documenting notebooks and (2) how data scientists perceive the three approaches that are used by the exemplary embodiment for generating documentation.

We conducted a within-subject controlled experiment with the 24 data scientist participants. Their task was to add documentation to a given draft notebook, which only has code and no documentation at all. The participants were told that they were adding documentation for the purpose of sharing those documented notebooks as tutorials for data science students who just started learning data science. Each participant was asked to finish two sessions, one with the exemplary embodiment's support (Experiment condition) and one without its support (Control Condition). We prepared two draft notebooks, one for each session. The two notebooks have the same length (9 code cells) and a similar level of difficulties, but for two different data science problems. To counterbalance the order effect, we randomized the order of the control condition and the experiment condition for each participant, so some participants encountered the exemplary embodiment in their first session, some others experienced it in their second session.

Each participant was given up to 12 minutes (720 seconds) to finish one session. Before the experiment condition session, we gave the participant a 1-minute quick demo on the functionality of the exemplary embodiment. After both sessions were done, we conducted a post-experiment semi-structured interview session to ask about their experience and feedback. We had a few pre-defined questions but participants were also encouraged to tell their stories and experience outside these structured questions.

We have three data sources: the observational notes and video recording for each session (N=48), the final notebook artifact out of each session (N=48), and the post-task questionnaire and interview transcripts (N=24). Our first group of measurements were from coding participants' behavioral data from the session recordings. In particular, we counted the task completion time (in secs) for all sessions. Then, for experimental conditions only, we also counted the following: how many times a participant clicked on the light bulb icon to check for suggestions (code cells checked for suggestions); how many times a participant directly used the generated documentation (markdown cells created by the exemplary embodiment); how many times a participant ignored the generated recommendations and manually created the documentation (markdown cells created by human); and how many time a markdown cell was co-created by human and the exemplary embodiment (markdown cells co-created by human and the exemplary embodiment).

Second, to evaluate the quality of the final notebook artifact, we defined a second group of measurements by counting: (i) the number of added markdown cells, and (ii) the number of added words, as these two are indicators of the quantity and effort each participant spent in a notebook. Also, we asked the participants to give an evaluation score to each of the two documented notebooks. We considered that number (−2 to 2) as a self-evaluation of the notebook quality. In addition, we asked two experts to code each of the 48 notebooks with a 3-dimensional rubric (based on Golara Garousi, Vahid Garousi, Mahmoud Moussavi, Guenther Ruhe, and Brian Smith, Evaluating usage and quality of technical software documentation: an empirical study, in *Proceedings of the* 17*th International Conference on Evaluation and Assessment in Software Engineering* (2013) pages 24-35, which will be familiar to the skilled artisan) to evaluate the documentation's readability, accuracy, and completeness in a notebook. Two experts' independent ratings achieved an agreement on the rating (r(48)=0.52, Spearman's Rho test).

For the experimental session only, we also asked the participants to finish a post-experiment survey (5-point Likert Scale, −2 as strongly disagree and 2 as strongly agree, refer to FIG. 21) to collect their feedback specific on the system's usability, helpfulness, accuracy, trust, satisfaction, and adoption propensity (based on Justin D. Weisz, Mohit Jain, Narendra Nath Joshi, James Johnson, and Ingrid Lange, BigBlueBot: teaching strategies for successful human-agent interactions, in *Proceedings of the* 24*th International Conference on Intelligent User Interfaces* (2019) pages 448-459, which will be familiar to the skilled artisan).

Last, for the interview transcripts, an iterative open coding method was conducted to obtain code, theme, and representative quotes as the third group of data. Each participant independently coded a subset of interview transcripts, and discussed the codes and themes together. After the discussion, they went back and reiterated the coding practice to apply the codes and themes to their assigned notebooks. Some examples of the identified themes are: pros and cons of the exemplary embodiment; preference of the three document generation approaches; future adoption, and suggestions for design improvement.

The table of FIG. 19 shows performance data in two conditions (M: mean, SD: standard deviation): the task completion time (secs), participants' satisfaction with the final notebook (from −2 to 2), graded notebook quality, number of markdown cells, and number of words. In particular, participants spent less time to complete the task in the experimental condition than the control condition; participants were more satisfied with the final notebook in the experimental condition than the control condition; and in this example, the final notebooks in the experimental condition were less readable than the control condition. Note, however, that while a carefully written human annotation without using the exemplary embodiment may be more readable than one assisted with the exemplary embodiment, this is not a fair comparison because in many cases, without the use of one or more embodiments, people simply do not prepare carefully written documentation.

Experimental data will now be presented re the user study results relating to: how the exemplary embodiment improved participants' performance on the task, how participants perceived the documentation generation methods in the exemplary embodiment, and how participants described the practical applicability of the exemplary embodiment.

The exemplary embodiment supports participants to easily add documentation to a notebook. Our experiments revealed that the exemplary embodiment improved participants' performance on the task by reducing task completion time and improving the satisfaction with the final notebooks. We performed a two-way repeated measures ANOVA to examine the effect of the two notebooks and the two conditions (with or without the exemplary embodiment) on task completion time. As shown in the table of FIG. 19, participants spent significantly less time ($p<0.001$) to complete the task using the exemplary embodiment in the experiment condition (M(SD)=391.12 (200.15)) than in the control condition (M(SD)=494.75 (184.28)). In addition, there was not a statistically significant effect of notebooks on task completion time, nor a statistically significant interaction between the effects of notebooks and conditions on completion time, which indicates that the two notebooks used in the task were properly designed.

Through coding the video recordings for only the experiment-condition sessions, we further examined how participants used the exemplary embodiment when it was available; e.g., did they check the recommendations it generated, did they actually use those recommendations in their documentations added into notebooks. We found that while the exemplary embodiment is available, for 80% of code cells, participants checked the recommended documentation by clicking on the light bulb icon to show the dropdown menu. In addition, we found that 45% of the added markdown cells were directly adopted from the exemplary embodiment's recommendation, while 12% of the added markdown cells were manually crafted by the human alone. The most interesting finding is that 41% of markdown cells were adopted from the exemplary embodiment, and then modified by human participants. The result suggested that most participants actually used the exemplary embodiment in the creation of documentation, and some of them formed a small collaboration between the human and the AI recommendation. The table of FIG. 20 shows usage data of the plugin in experimental conditions (mean: $\bar{x}$, standard deviation: $\sigma$). The results indicate that participants used the plugin for recommended documentation on most code cells ($\bar{x}$=86.11%). For markdown cells in the final notebooks, $\bar{x}$=45.31% were directly adopted from the plugin's recommendation, while $\bar{x}$=41.52% were modified from the plugin's recommendation and $\bar{x}$=12.16% were created by participants from scratch.

The post-experiment survey result supported our findings. Most participants believed it was easier to accomplish the task with the exemplary embodiment's help (22 out of 24 rated agree or higher), as shown in FIG. 21. Furthermore, the exemplary embodiment generated recommendation was accurate (20 out of 24 rated agree or higher). Looking into the qualitative interview data, we can find some potential explanations for why participants believed so. Participants reported that the exemplary embodiment provided them something to begin with, thus it was easier than starting from scratch.

The exemplary embodiment increases participant's satisfaction, while maintaining a similar quality of the final notebook. The post-task questionnaire revealed that participants were more satisfied with the final notebook after using the exemplary embodiment in the experimental condition than in the control condition (p=0.04). The interview results also supported this finding.

The exemplary embodiment also motivates participants to document the analysis details. Although we did not see a difference in the number of markdown cells created in two conditions or the number of words in total, the exemplary embodiment helps participants overcome the procrastination of writing documentation and reminds them to document things that they might otherwise ignore. Moreover, participants believed that the exemplary embodiment can help them form a better documenting practice in the long term.

The two experts' gradings for the notebook quality suggest that notebooks from both conditions have a relatively similar quality level. Experts rated that notebooks written in the control condition are more readable than those written with the exemplary embodiment (p<0.001). A higher readability score means less formatting, spelling, or grammar issues. For the other two dimensions of the quality rubric (accuracy and completeness), there was not a significant difference. Also, as discussed above, since many scientists or engineers will not document code adequately without help from a tool such as provided by one or more embodiments, a more realistic comparison is between annotations produced by one or more embodiments, and the sparsely-annotated or non-annotated code typically produced without one or more embodiments.

The three generation approaches are suitable for different scenarios. An in-depth analysis will now be provided regarding how participants perceived the three different approaches that the exemplary embodiment implemented to generate documentations: the deep-learning-based approach, the query-based approach, and the prompt-based approach. In the post-experiment interview, we explained how the exemplary embodiment generated the documentation with these three approaches, and asked participants if they liked or disliked one particular approach.

Participants reported that they felt the deep-learning-based approach provided concise and general descriptions of the analysis process.

Participants also suggested that the deep-learning-based approach sometimes generated inaccurate or very vague documentation; however, the deep-learning-based approach was still perceived as useful. As it is short and with only a couple of keywords, many participants believe it may be more suitable for some quick and simple documentation tasks, or for the analyst audience who can understand these short keywords.

In terms of the query-based approach, participants believed that the documentation generated from this approach contains longer and more descriptive information. This approach is further perceived to be more suitable for educational purposes.

Participants also acknowledged that such a query-based approach may not work for some scenarios. For example, participants found that in some instances, the query-based approach was not useful for summarizing the very fundamental level data manipulations, as there was no core API method in it. Some participants mentioned that the usefulness of this query-based approach depends on the audience (perhaps more appropriate for a novice).

We observed in the video recordings that participants rarely used the prompt-based approach in the session. The interview data confirmed our speculation. Some participants the that they liked the idea of user prompts, but they did not use it because the deep-learning-based approach and the query-based approach already gave them the actual content.

Many participants preferred a hybrid approach to combine the deep-learning-based approach and the query-based approach. In this regard, deep-learning-based indicates what the code cell is doing in general and query-based provides the details of the function.

Will participants use the exemplary embodiment in their future data science project? Most participants indicated that they would like to use the exemplary embodiment in the future when answering the survey question as shown in FIG. 21. The interview data provides more detail and evidence to elaborate on this result. Participants suggested various scenarios in which the exemplary embodiment could be useful in their future work, such as if they needed to add documentation during the exploration process for future reference, or they needed to document a notebook in a post-hoc way for sharing it with collaborators, or they needed to mentor a team member who is a novice data scientist, or they needed to refactor an ill-documented notebook written by others. It is believed that one or more embodiments are particularly suited for those who write code first, rather than those who write documentation first.

In our experiment, we provided the scenario as they were documenting the notebook as a tutorial for some data science students. In the interview, we asked how participants would document a notebook differently if they were created documentation for the notebooks for non-technical domain experts audience. Some participants suggested that computational notebooks may not be a good medium to present the analysis to non-technical domain experts. They would prefer to curate all the textual annotations in a standalone report or slide decks. Some others believed that the notebook could work as the medium but they would change the documentation by using less technical terminology, adding more details on topics that the non-technical domain experts would be interested in (e.g., how data is collected, potential bias in the analysis).

Summary of the Results. In summary, our study found that the exemplary embodiment can support data scientists in generating documentation by significantly reducing their time spent on the task, and improving the perceived satisfaction level of the final notebook. When the exemplary embodiment is available, participants are very likely to check the generated documentation as a reference. Many of them directly used the generated documentation, a few of them still prefer to manually type the documentation, while many of them adopted a human-AI co-creation approach that they used the AI-generated one as a baseline and keep improving on top of it. Participants perceived the documentation generated by the deep-learning-based approach as a short and concise overview, the documentation generated by the query-based approach as descriptive and useful for educational purposes, but they rarely used the prompt-based approach. Overall, participants enjoyed the exemplary embodiment and would like to use it in the future for various documenting purposes.

We have found that participants who had AI support in the documentation task produced documentation that was just as good as participants without AI support. It is believed that AI-supported documentation of computational notebooks can advantageously be viewed as a co-creative process in which humans and machine teammates work together to document a notebook. Viewed this way, we have found that the combined human+AI effort produced human-level quality at a more rapid pace than what human or AI could achieve alone. We have found that the interaction pattern in which the AI creates "first draft" quality documentation, followed by human review and editing, resulted in a final artifact that not only met the bar for quality, but exceeded it for level of satisfaction. Participants were happier with their documentation when they worked with the AI system to create it, rather than when they worked alone. Thus, we conclude that the benefits of having an AI partner in this task stem from being able to produce the same high level of objective quality, but at a much more rapid pace (20% faster on average) and with a higher level of satisfaction with the end product.

We have found that for people to be accepting of the AI's suggestions, it is helpful if the initiative in taking those suggestions was kept by the human. Participants reported that they enjoyed being able to see multiple suggestions, created using different algorithms, and select the one that was the closest match to their intent in documenting a code cell.

We have found that well-documented notebooks explain more than the behavior of the code. Notebooks cover various topics including describing and interpreting the output of the code, explaining reasons for choosing certain algorithms or models, educating the audience from different levels of expertise, and so on.

Thus, it will be appreciated that many interventions and lessons learned about documentation in software engineering may not work the same in data science. For example, how can the quality of the documentation be evaluated? Software documentation can be assessed based on attributes such as completeness, organization, the relevance of content, readability, and accuracy. We found in our experiments that the quality score assessed by certain rubrics may not reflect users' satisfaction with the final notebooks. Traditional template-based approaches to aid documentation writing may not work in data science because they cannot capture broader aspects of documentation, and limit the expressiveness of storytelling.

In conclusion, one or more embodiments provide automated documentation generation in computational notebooks, facilitating documentation creation through a deep-learning-based approach to generate summarization from source code, a query-based approach to retrieve online API documentation, and a prompt-based approach to encourage documentation writing. Experiments suggest that the collaboration between data scientists and one or more embodiments significantly reduced task completion time and resulted in a final artifact that not only met the bar of quality but also exceed it for the level of satisfaction.

Given the discussion thus far, it will be appreciated that, in general terms, an exemplary method, according to an aspect of the invention, includes obtaining, at a computing device, a segment of computer code. For example, referring to FIG. 8A, in step 802, a computing device on which modules 813 and 815 are implemented obtains the code cell. The skilled artisan will appreciate that what is obtained is typically source code in a higher-level language, such as a machine learning/data science programming language. A further step 803 includes, with a classification module (e.g. 813) of a machine learning system executing on the computing device, determining a required annotation category for the segment of computer code. For example, a trained classification model LSTM can assign those input source code snippets into one of the listed categories in FIG. 6 or 13 or the like. An even further step 804 includes, with an annotation generation module (e.g. 815) of the machine learning system executing on the computing device, generating a natural language annotation of the segment of computer code based on the segment of computer code and the required annotation category. This can be done, for example, using a trained classifier, trained as described with respect to FIGS. 9 and 17A. A still further step 805 includes providing the natural language annotation to a user interface for display adjacent the segment of computer code.

One or more embodiments further include generating an Abstract Syntax Tree (AST) structure of at least the segment of computer code (see FIG. 16). In such cases, the natural language annotation of the segment of computer code is further based on the Abstract Syntax Tree (AST) structure. The annotation generation module, in one or more embodiments, includes a graph neural network One or more embodiments further include, with the classification module 813, determining a stage (see FIGS. 6 and 14) of a data science workflow to which the segment of computer code corresponds. In such instances, the determining, with the classification module, of the required annotation category is based on the stage of the data science workflow.

Many different categories can be used as appropriate; in a non-limiting example, the category is selected from the group consisting of process, result, education, reference, and reason. Furthermore, many different stages can be sued as appropriate; in a non-limiting example, the stage is selected from the group consisting of environment configuration, data preparation and exploration, feature engineering and selection, and model building and selection (for example, take the top ranked category/stage).

One or more embodiments further include training the classification module by using well-documented notebooks including best practices, with extracted source code from the well-documented notebooks as input, and expert-labeled categories from the notebooks as output.

Furthermore, one or more embodiments further include training the annotation generation module by using well-documented notebooks including best practices, with extracted source code from the well-documented notebooks as input, and raw annotation sentences as output.

In one or more embodiments, user input is obtained responsive to the display. The user could decide to retain the system-generated annotation or modify it in response to the display.

In some cases, the annotation could lead to a discovery of an error in the code (whether discovered by the author or another) and the error in the segment of computer code could be corrected responsive to the display. For example, edit the source code to mitigate the detected problem and recompile/re-interpret the edited source code, then use the resulting machine-executable corrected code to carry out some computational task, control a physical system over network interface, and/or the like.

In one or more embodiments, the user interface includes a computational notebook 811 implemented on a client computer device, and a further step includes, with the user interface, displaying the natural language annotation to a user adjacent the segment of computer code—see, e.g., FIG. 7.

One or more embodiments use neural networks and are not limited to a rule-based approach. One or more embodiments are not limited to only annotating APIs, but can handle generalized code segments including constructs other than APIs.

Figure 22:
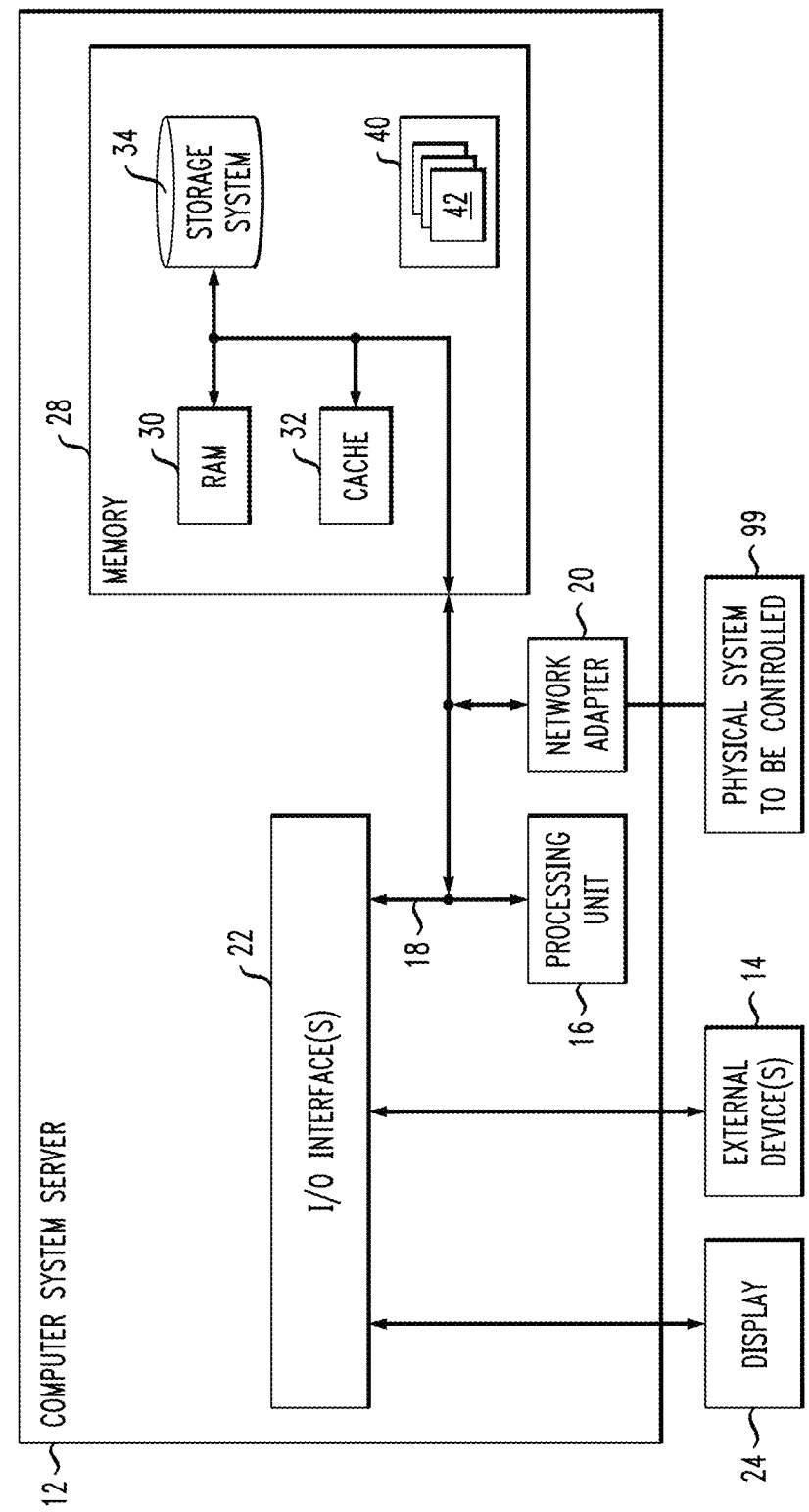
FIG. 22 depicts a computer system that may be useful in implementing one or more aspects and/or elements of the invention, also representative of a cloud computing node according to an embodiment of the present invention.

In another aspect, an exemplary system includes a memory (e.g. 30, discussed elsewhere); a non-transitory computer readable medium (e.g. 34, discussed elsewhere) including computer executable instructions; and at least one processor 16, coupled to the memory and the non-transitory computer readable medium, and operative to execute the instructions to be operative to perform any one, some, or all of the method steps described above. The instructions on the medium can also configure the processor to instantiate appropriate software components; for example, modules 813 and 815, the user interface (on the client device), and so on. The system discussed below with regard to FIG. 22 is representative, for example, both of a server that executes modules 813 and 815, and a client that runs the notebook. The client and server can be connected by known networking/internetworking technologies.

One or more embodiments of the invention, or elements thereof, can accordingly be implemented in the form of an apparatus/system including a memory and at least one processor that is coupled to the memory and operative to perform exemplary method steps. FIG. 22 depicts a computer system that may be useful in implementing one or more aspects and/or elements of the invention, also representative of a cloud computing node according to an embodiment of the present invention. Referring now to FIG. 22, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 22, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 22, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 22) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 (or one or more elements thereof) to provide learning-based automated machine learning code annotation with a graph neural network and the like, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described (e.g., notebook/user interface 811, classification module 813, and/or annotation generation module 815). The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules. A physical system 99 can be controlled by code (e.g. 42) that has been annotated and corrected using aspects of the invention; many physical systems can be controlled such as manufacturing or security equipment, networks of computers, and the like; for example, by commands over network adapter 20.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, at a computing device, a segment of computer code;
    with a classification module of a machine learning system executing on said computing device, determining a stage from a predefined set of stages of a data science workflow to which said segment of computer code corresponds and determining a required annotation category from a predefined set of categories for said segment of computer code based on said stage of said data science workflow;
    with an annotation generation module of said machine learning system executing on said computing device, generating a natural language annotation of said segment of computer code based on said segment of computer code and said required annotation category;
    generating an Abstract Syntax Tree (AST) structure of at least said segment of computer code, wherein said natural language annotation of said segment of computer code is further based on said Abstract Syntax Tree (AST) structure, wherein said annotation generation module includes a graph neural network; and
    providing said natural language annotation to a user interface for display adjacent said segment of computer code.

2. The method of claim 1, wherein:
    said category is selected from a group consisting of process, result, education, reference, and reason; and
    said stage is selected from a group consisting of environment configuration, data preparation and exploration, feature engineering and selection, and model building and selection.

3. The method of claim 2, further comprising training said classification module by using documented notebooks, with extracted source code from said documented notebooks as input, and expert-labeled categories from said notebooks as output.

4. The method of claim 3, further comprising:
    obtaining a link or a reference to external application programming interface (API) documentation for a code function pasted in said documented notebooks;
    collecting application programming interface (API) names from data science packages and short descriptions from external documentation sites related to said external application programming interface (API) documentation via a crawling script;
    matching said application programming interface (API) names with said code functions and concatenating said corresponding descriptions; and
    wherein said providing to said user interface for display adjacent said segment of computer code is based on said concatenated descriptions.

5. The method of claim 2, further comprising training said annotation generation module by using documented notebooks, with extracted source code from said documented notebooks as input, and raw annotation sentences as output.

6. The method of claim 1, further comprising obtaining user input responsive to said display and retaining said natural language annotation responsive thereto.

7. The method of claim 1, further comprising obtaining user input responsive to said display and modifying said natural language annotation responsive thereto.

8. The method of claim 1, further comprising correcting an error in said segment of computer code responsive to said display.

9. The method of claim 1, wherein said user interface comprises a computational notebook implemented on a client computer device, further comprising, with said user interface, displaying said natural language annotation to a user adjacent said segment of computer code.

10. An apparatus comprising:
    a memory;
    a non-transitory computer readable medium including computer executable instructions; and
    at least one processor, coupled to the memory and the non-transitory computer readable medium, and operative to execute the instructions to be operative to:
        instantiate a classification module and an annotation generation module;
        obtain a segment of computer code;
        with said classification module, determine a stage from a predefined set of stages of a predefined data science workflow to which said segment of computer code corresponds and determine a required annotation category from a predefined set of categories for said segment of computer code based on said stage of said data science workflow;
        with said annotation generation module, generate a natural language annotation of said segment of computer code based on said segment of computer code and said required annotation category;
        generate an Abstract Syntax Tree (AST) structure of at least said segment of computer code, wherein said natural language annotation of said segment of computer code is further based on said Abstract Syntax Tree (AST) structure, wherein said annotation generation module includes a graph neural network; and
        provide said natural language annotation to a user interface for display adjacent said segment of computer code.

11. The apparatus of claim 10, wherein:
    said category is selected from a group consisting of process, result, education, reference, and reason; and
    said stage is selected from a group consisting of environment configuration, data preparation and exploration, feature engineering and selection, and model building and selection.

12. The apparatus of claim 11, wherein said at least one processor is further operative to train said classification module by using documented notebooks, with extracted source code from said documented notebooks as input, and expert-labeled categories from said notebooks as output.

13. The apparatus of claim 11, wherein said at least one processor is further operative to train said annotation generation module by using documented notebooks, with extracted source code from said documented notebooks as input, and raw annotation sentences as output.

14. The apparatus of claim 10, further comprising a computational notebook implemented on a client computer device interconnected with said at least one processor, wherein said natural language annotation is displayed to a user adjacent said segment of computer code.

15. A non-transitory computer readable medium comprising computer executable instructions which when executed by a computer cause the computer to perform a method of:
  instantiating a classification module and an annotation generation module;
  obtaining, at said computer, a segment of computer code;
  with said classification module, determining a stage from a predefined set of stages of a predefined data science workflow to which said segment of computer code corresponds and determining a required annotation category from a predefined set of categories for said segment of computer code based on said stage of said data science workflow;
  with said annotation generation module, generating a natural language annotation of said segment of computer code based on said segment of computer code and said required annotation category;
  generating an Abstract Syntax Tree (AST) structure of at least said segment of computer code, wherein said natural language annotation of said segment of computer code is further based on said Abstract Syntax Tree (AST) structure, wherein said annotation generation module includes a graph neural network;
  providing said natural language annotation to a user interface for display adjacent said segment of computer code;
  training said classification module by using documented notebooks, with extracted source code from said documented notebooks as input, and expert-labeled categories from said notebooks as output;
  obtaining a link or a reference to external application programming interface (API) documentation for a code function pasted in said documented notebooks;
  collecting application programming interface (API) names from data science packages and short descriptions from external documentation sites related to said external application programming interface (API) documentation via a crawling script;
  matching said application programming interface (API) names with said code functions and concatenating said corresponding descriptions; and
  wherein said providing to said user interface for display adjacent said segment of computer code is based on said concatenated descriptions;
  wherein:
  said category is selected from a group consisting of process, result, education, reference, and reason; and
  said stage is selected from a group consisting of environment configuration, data preparation and exploration, feature engineering and selection, and model building and selection.

* * * * *